(12) United States Patent
Klatsky et al.

(10) Patent No.: US 11,751,103 B2
(45) Date of Patent: *Sep. 5, 2023

(54) VARIABLE APPLICATION OF QUALITY OF SERVICE

(71) Applicant: Comcast Cable Communications, LLC, Philadelphia, PA (US)

(72) Inventors: Carl Klatsky, Yardley, PA (US); Jason Combs, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,742

(22) Filed: Sep. 24, 2021

(65) Prior Publication Data

US 2022/0086701 A1   Mar. 17, 2022

Related U.S. Application Data

(63) Continuation of application No. 16/530,342, filed on Aug. 2, 2019, now Pat. No. 11,172,408, which is a continuation of application No. 15/856,289, filed on Dec. 28, 2017, now Pat. No. 10,419,977.

(51) Int. Cl.
| | |
|---|---|
| *H04W 28/00* | (2009.01) |
| *H04W 28/26* | (2009.01) |
| *H04L 65/1069* | (2022.01) |
| *H04L 41/0896* | (2022.01) |
| *H04L 65/80* | (2022.01) |
| *H04L 67/55* | (2022.01) |
| *H04W 72/542* | (2023.01) |
| *H04L 67/14* | (2022.01) |

(52) U.S. Cl.
CPC ......... *H04W 28/26* (2013.01); *H04L 41/0896* (2013.01); *H04L 65/1069* (2013.01); *H04L 65/80* (2013.01); *H04L 67/55* (2022.05); *H04W 72/542* (2023.01); *H04L 67/14* (2013.01)

(58) Field of Classification Search
None
See application file for complete search history.

(56) References Cited

U.S. PATENT DOCUMENTS

| | | | |
|---|---|---|---|
| 9,154,589 B1 * | 10/2015 | Klein | .................... H04L 41/083 |
| 9,961,017 B2 | 5/2018 | Jacob et al. | |
| 9,967,166 B2 * | 5/2018 | Gous | ................... H04L 43/0882 |
| 10,291,548 B2 | 5/2019 | Jacob et al. | |
| 10,742,498 B2 | 8/2020 | Subramanian et al. | |
| 2002/0199012 A1 | 12/2002 | Cable et al. | |

(Continued)

OTHER PUBLICATIONS

"PacketCable Multimedia Specification," Specification, Nov. 11, 2015, pp. 1-164, Version I07, Cable Television Laboratories, Inc.

*Primary Examiner* — Gerald A Smarth
(74) *Attorney, Agent, or Firm* — Banner & Witcoff, Ltd.

(57) ABSTRACT

Methods, systems, and apparatuses are described for variably selecting and managing a quality of service framework within a network. A network data store may be accessed to obtain information indicating current network conditions, network policies, and/or device scripts. This information may be used to determine whether and when to allocate network resources, such as bandwidth, for particular services within the network to implement quality of service based on current network/link conditions.

28 Claims, 8 Drawing Sheets

(56) References Cited

U.S. PATENT DOCUMENTS

| | | |
|---|---|---|
| 2003/0118027 A1 | 6/2003 | Lee et al. |
| 2005/0086339 A1* | 4/2005 | Krishnan .............. H04L 69/163 |
| | | 709/223 |
| 2006/0259733 A1 | 11/2006 | Yamazaki et al. |
| 2008/0205452 A1 | 8/2008 | Chou |
| 2009/0037606 A1 | 2/2009 | Diab |
| 2009/0109932 A1 | 4/2009 | Maheshwari et al. |
| 2009/0279568 A1 | 11/2009 | Li et al. |
| 2011/0158113 A1* | 6/2011 | Nanda .................. H04L 12/185 |
| | | 370/468 |
| 2012/0044955 A1 | 2/2012 | Chandrasekaran et al. |
| 2012/0069813 A1 | 3/2012 | Cho et al. |
| 2012/0151042 A1 | 6/2012 | Garg et al. |
| 2012/0278400 A1 | 11/2012 | Elson et al. |
| 2013/0022056 A1 | 1/2013 | Crosby et al. |
| 2013/0091248 A1 | 4/2013 | Viswanathan et al. |
| 2013/0138807 A1 | 5/2013 | Perkuhn et al. |
| 2013/0239154 A1 | 9/2013 | Bagasra |
| 2013/0339529 A1 | 12/2013 | Rizzo et al. |
| 2014/0082212 A1 | 3/2014 | Garg et al. |
| 2018/0367585 A1* | 12/2018 | Lu ........................... H04L 65/65 |

\* cited by examiner

VARIABLE APPLICATION OF QUALITY OF SERVICE

CROSS REFERENCE TO RELATED APPLICATION

This application is a continuation of and claims benefit of priority from U.S. application Ser. No. 16/530,342, filed Aug. 2, 2019, which is a continuation of U.S. application Ser. No. 15/856,289 filed Dec. 28, 2017, now U.S. Pat. No. 10,419,977. The contents of the above listed applications are expressly incorporated herein by reference in their entireties for any and all non-limiting purposes.

BACKGROUND

Networks transport large volumes of data, such as high-quality video and/or delay-sensitive voice data, between various nodes and access endpoints to provide various services to users. Establishing appropriate Quality of Service (QoS) is a key aspect of providing these services to users. For many types of services, this has conventionally consisted of allocating a portion of network bandwidth on a per-session basis notwithstanding the availability of resources or current conditions within the network.

SUMMARY

The following summary provides examples only, and is not intended to limit or constrain the detailed description.

Frameworks for variably applying quality of service may be based on current network conditions and specified parameters. Systems and/or devices may determine current conditions within the network, such as an amount of bandwidth available between an access endpoint and a termination system, and may use this information to selectively implement or establish different QoS within the network.

For example, a device may retrieve information from a data store to determine an amount of bandwidth or other network conditions. The device may compare this information to specified parameters to determine how quality of service should be implemented. The device may vary the way in which a QoS framework may be implemented/established depending on current network conditions and/or communication link connection characteristics established during link initialization.

As will be described herein, the variable quality of service framework discussed above is not limited to bandwidth reservations for voice calls and may be used in other resource reservation arrangements, such as reserving network resources for data services, video services, and the like. Additionally, or alternatively, this variable quality of service framework may be applied for upstream bandwidth reservations, downstream bandwidth reservations, and/or for bandwidth reservations in both directions.

BRIEF DESCRIPTION OF THE DRAWINGS

Other elements, examples, and advantages as described herein will become better understood with regard to the following description, claims, and drawings. The description herein is shown by way of example, and is not limited by, the accompanying figures in which like numerals indicate similar elements.

DETAILED DESCRIPTION

In the following description of examples, reference is made to the accompanying drawings, which form a part hereof, and in which are shown, various examples of how the disclosure may be practiced. It is to be understood that other examples may be utilized, and structural and functional modifications may be made, without departing from the scope of the disclosure.

Figure 1:
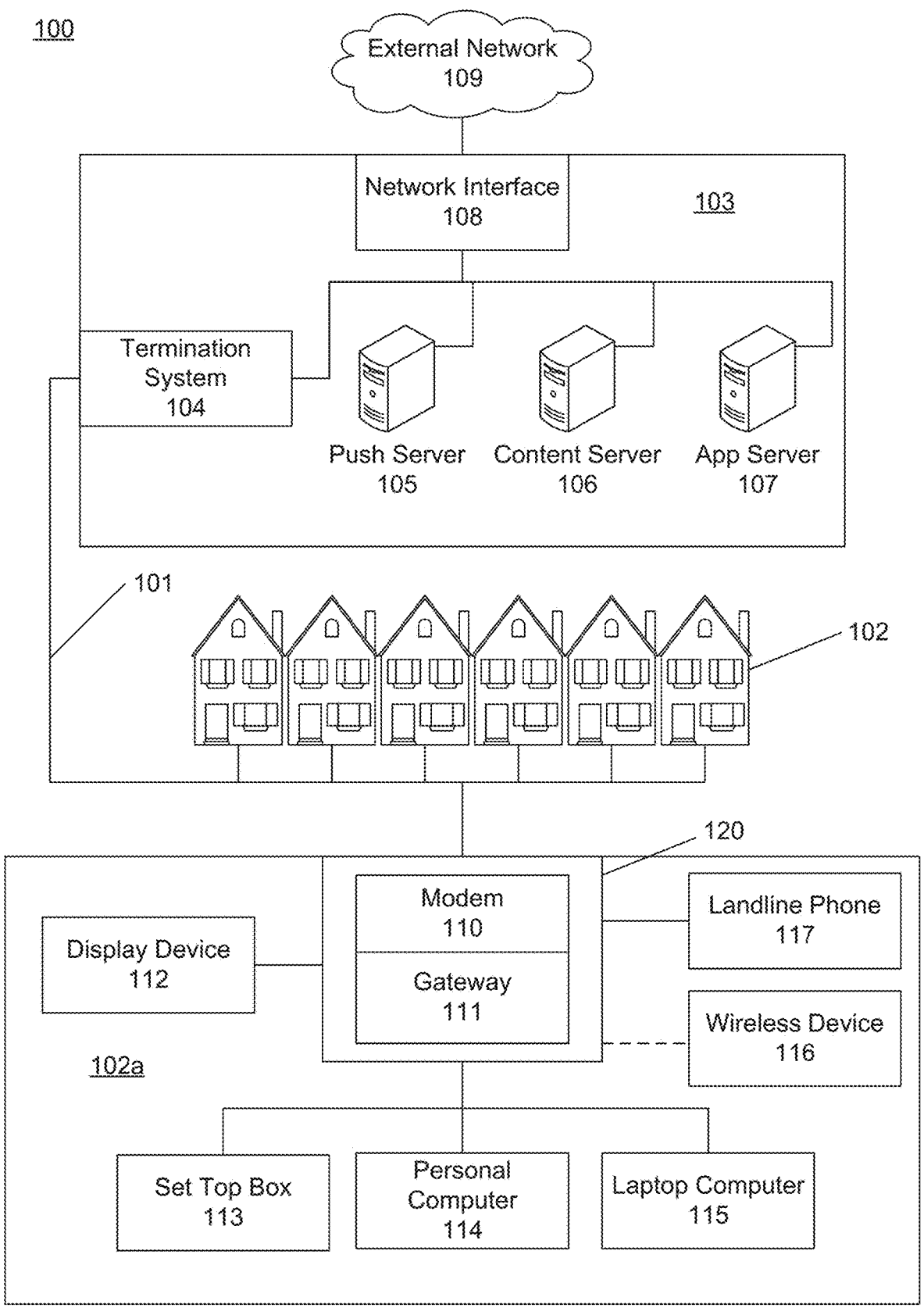
FIG. 1 shows an example communication network.

FIG. 1 shows an example communication network 100 in which elements and/or examples described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect the multiple premises 102, such as businesses, homes, or user dwellings to a local office 103 or headend. The local office 103 may transmit downstream information signals onto the links 101 and the premises 102 may have receivers used to receive and to process those signals.

A link 101 originating from the local office 103 may be split a number of times to distribute the signal to the various premises 102. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-07. The interface 104 may be as specified in a standard, such as the Data Over Cable Service Interface Specification (DOCSIS) standard, published by Cable Television Laboratories, Inc. (a.k.a CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. These networks 109 may transmit content to the local office 103 via a plurality of variable size, fixed duration video fragments. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. The local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate, retrieve and receive requested content, to encrypt the content, and to initiate delivery by streaming of the content to the requesting user or device. The content may comprise a plurality of fixed size, variable duration video fragments. The local office 103 may include a load balancer (not shown) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET. The application server 107 may be responsible for collecting television program listings information and generating a data download for electronic program guide listings. The application server 107 may be responsible for monitoring user viewing habits and collecting that information for use in selecting advertisements. The application server 107 may be responsible for formatting and inserting advertisements in a video stream being transmitted to the premises 102. Although shown separately, one of ordinary skill in the art will appreciate that the push server 105, the content server 106 and the application server 107, may be combined. Further, here the push server 105, the content server 106, and the application server 107 are shown generally, and it will be understood that they may each contain memory storing computer executable instructions to cause a processor to perform steps described herein or memory for storing data.

An example premise 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for the coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, the additional STBs 113 or DVRs, the personal computers 114, the laptop computers 115, the wireless devices 116 such as wireless routers, wireless laptops, notebooks, tablets, netbooks, or smart phones, cordless phones, for example, Digital Enhanced Cordless Telephone-DECT phones, mobile phones, mobile televisions, personal digital assistants (PDA), the landline phones 117, which may be Voice over Internet Protocol (VoIP) phones, and any other desired devices. Examples of the local network interfaces may include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others. The gateway interface device 111 or a display device 112 may be used to view video content delivered from the content server 106. Additionally, the gateway interface device 111 or a display device 112 may be used to schedule recordings of the video content or to display a program listing indicating start and end times for video content. Various elements of the example communication network shown in FIG. 1 are computing devices, such as the modem 110, the app server 107, and the STB 113.

Figure 2:
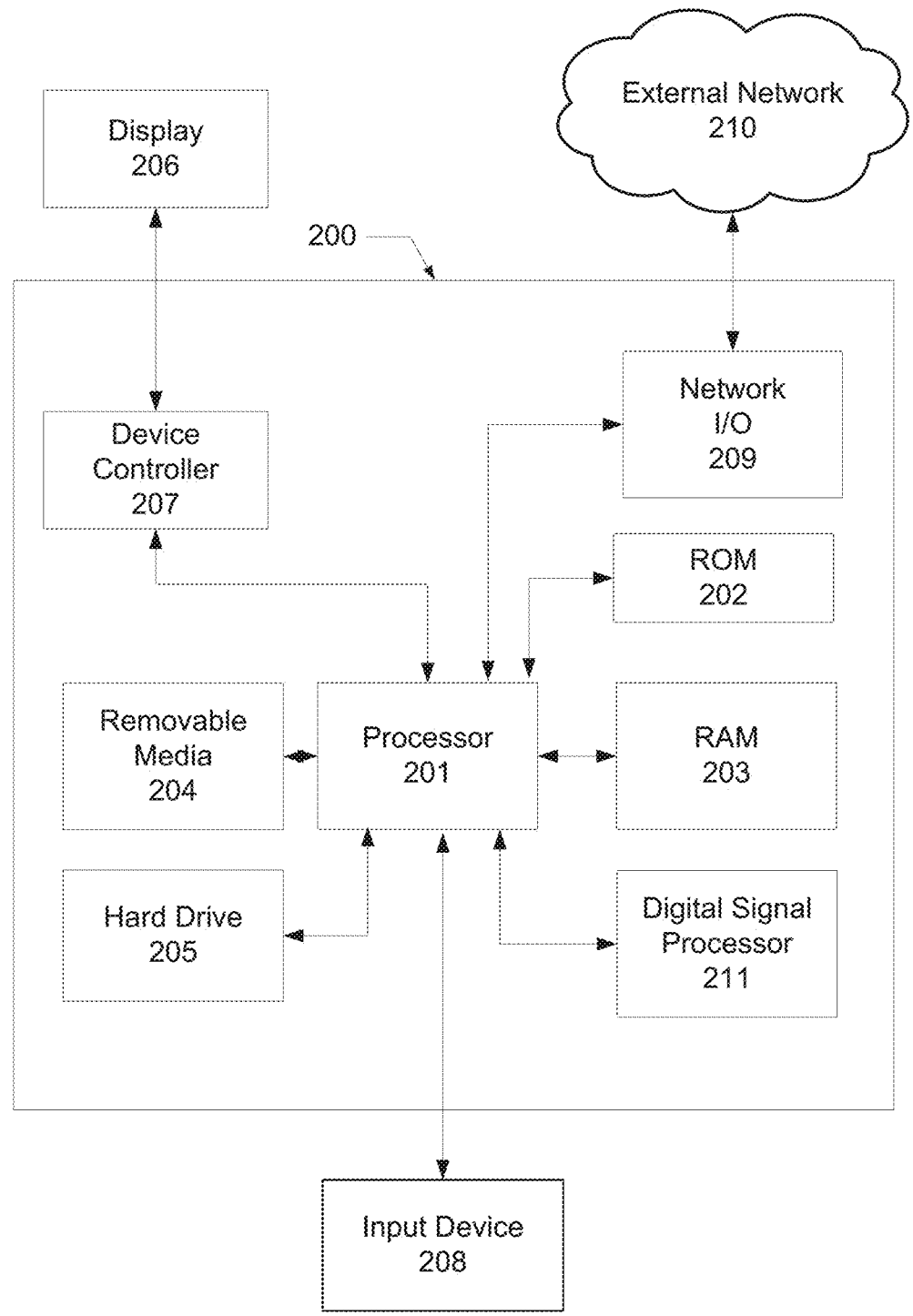
FIG. 2 shows an example computing device.

Having described the communication network shown in FIG. 1 in which various elements and/or examples described herein may be implemented, example hardware elements as shown in FIG. 2 will be described. The general hardware elements shown in FIG. 2 may be used to implement any of the various computing devices described herein. One or more of the computing devices in the network 100, such as the modem 110, the gateway 111, the STB 113, the personal computer 114, the laptop 115, and the wireless device 116, may include some or all of the general hardware elements shown in FIG. 2. A computing device 200 may include one or more processors 201, which may execute instructions of a computer program to perform any of the elements and/or examples described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. Instructions may also be stored in an attached, or internal, hard drive 205. The computing device 200 may include one or more output devices, such as a display 206, (e.g., an external television or monitor, or an integrated display), and may include one or more output device controllers 207, such as a video processor. There may also be one or more user input devices 208, such as a remote control, keyboard, mouse, touch screen, microphone, camera for capturing images and/or video, and the like. One or more input devices 208 may be integrated within the computing device 200.

The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. The landline phone 117 may be integral to and/or a physical aspect of the network I/O 209. The computing device 200 may also include digital signal processor, such as digital signal processor (DSP) 211, that measures, filters, and/or compresses signals in real-time. The DSP 211 may process real-time transport protocol (RTP) messages to deliver services over the network. The DSP 211 may process different types of signals, such as voice, data, video signals, to improve the incoming signal into clear sound, faster data, or sharper images. As an example, the DSP 211 may receive and process signals from the landline phone 117.

FIG. 2 shows an example with a hardware configuration. However, the components shown in FIG. 2 may be wholly or partially implemented as software as well. Modifications may be made to add, remove, combine, divide, etc. components of the computing device 200 as desired. Additionally, the components may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity may be a separate software process and program from a dependent entity, both of which may be executed as software on a common computing device).

The elements and/or examples described herein may be embodied in a computer-usable data and/or computer-executable instructions, such as in one or more program modules, executed by one or more computers or other devices. Generally, program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more elements and/or examples described herein, and such data structures are contemplated within the scope of computer executable instructions and computer-usable data described herein.

Although examples are described above, the various elements, examples, and/or steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

Generally, deploying media services (e.g., real-time voice calls, online gaming, streaming content, video-conferencing) within a communication network, such as a DOCSIS network or any other desired network, may require enough bandwidth to successfully implement/establish quality of service (QoS) in a manner that meets user demands and ensures that the services are of a sufficient quality. For example, a system may include various policy-based authorization controls to police network resources and activation requests within the network. Such authorization controls may be specified in a standard, such as the PacketCable™ Multimedia (PCMM) standard, published by CableLabs. The PacketCable standard provides an architectural framework to ensure the deployment of multimedia services, such as voice, video, or data, over a network. Under the PacketCable standard, a termination system may manage QoS-based service flows, such as the creation and installation of policy-based controls for specific network resources supporting the QoS-based delivery of multimedia services.

As described above with respect to FIG. 1, a cable modem (e.g., the modem 110) and termination system (e.g., the TS 104) together may enable the bidirectional exchange of data (e.g., IP packets) over the network and/or communication links. Two communication channels may be used to send the data: a downstream channel for data sent from the termination system to a modem (or group of modems), and an upstream channel for data sent from the modem(s) to the termination system. Data transmitted over the downstream channel may be detected by network devices (e.g., user or customer premise equipment "CPE", modems), and because these devices also share the same upstream channel, upstream bandwidth may be divided into timeslots and allocated by the termination system to particular devices.

Bandwidth may represent the capacity of a network connection for supporting data transfers, and may refer to the data rate of available or consumed information supported by a network interface. The network bandwidth may be measured in units of bits per second. Bandwidth may describe, for example, a bit-rate, channel capacity, or a maximum throughput of a communication path/link in the network. Higher network bandwidth may often translate to better performance within the network.

If a device (e.g., the modem 110, the set-top box 113, the personal computer 114, the wireless device 116) needs to transmit data in the upstream direction, the device may request the termination system to reserve enough bandwidth to send the data it may be waiting to transmit. The device may use this bandwidth request to ask the termination system (or another device) for a data grant of a specified size to transmit the data. The device may transmit a request/communication to an application server, such as the application server 107, to cause the server to transmit a bandwidth request to the termination system. The headend may access the Internet (and/or other networks) via communication links. The termination system, on the users' side of the headend, may enable communication with the users' modems (e.g., the modem 110) and/or other devices. The termination system may periodically transmit messages to various devices in the network indicating if each device may transmit data over a communication link in the upstream direction. Thus, each device may compete against other devices for bandwidth and other network resources.

Furthermore, an amount of bandwidth may be reserved/allocated by the termination system for services provided by a device to ensure that there is enough bandwidth on the communication link to the device to provide a threshold quality of service. If a bandwidth request arrives at the termination system and the termination system has (enough) available bandwidth, the termination system may grant data transmission opportunities to the device by allocating a portion of bandwidth. However, in some instances, even if the termination system receives the bandwidth request, it may not allocate a portion of bandwidth to the requesting device due to a lack of available upstream bandwidth. If the device has finished transmitting data using the allocated bandwidth, the device may release the bandwidth to the termination system. Systems employing the PacketCable resource management standard may, as described above, may use the termination system to allocate bandwidth (during call-setup) for voice call requests and/or other service requests.

As more bandwidth becomes available within network systems, the termination system may more liberally allocate network resources, and the decision as to whether to reserve an amount of bandwidth may be made locally by network elements (e.g., the application server 107) and/or access endpoints within the network, such as user or customer premise equipment (CPE). As will be discussed below, a computing device (e.g., a voice-over-IP device, laptop, mobile device, etc.) may determine that enough bandwidth (or other network resources) is available on the network and/or one or more communication links such that it may trigger the request of a pre-allocation of bandwidth for the voice call, rather than waiting until the user initiates the voice call (e.g., during call setup) to trigger the request for bandwidth from the termination system. The access endpoint may transmit a data transfer message to an application server that causes the application server to make the bandwidth request through to the termination system. By pre-allocating (e.g., reserving) bandwidth for a voice call in advance of the voice call being invoked/initiated, the system effectively reduces the amount of time to perform the call setup because the bandwidth reservation for the voice call has already occurred, and as such, the system and voice network may be able to process the voice call setup more quickly and efficiently than conventional systems to ensure a service application (and/or access endpoint) has enough bandwidth for providing high quality of service and an improved user experience.

Figure 3:
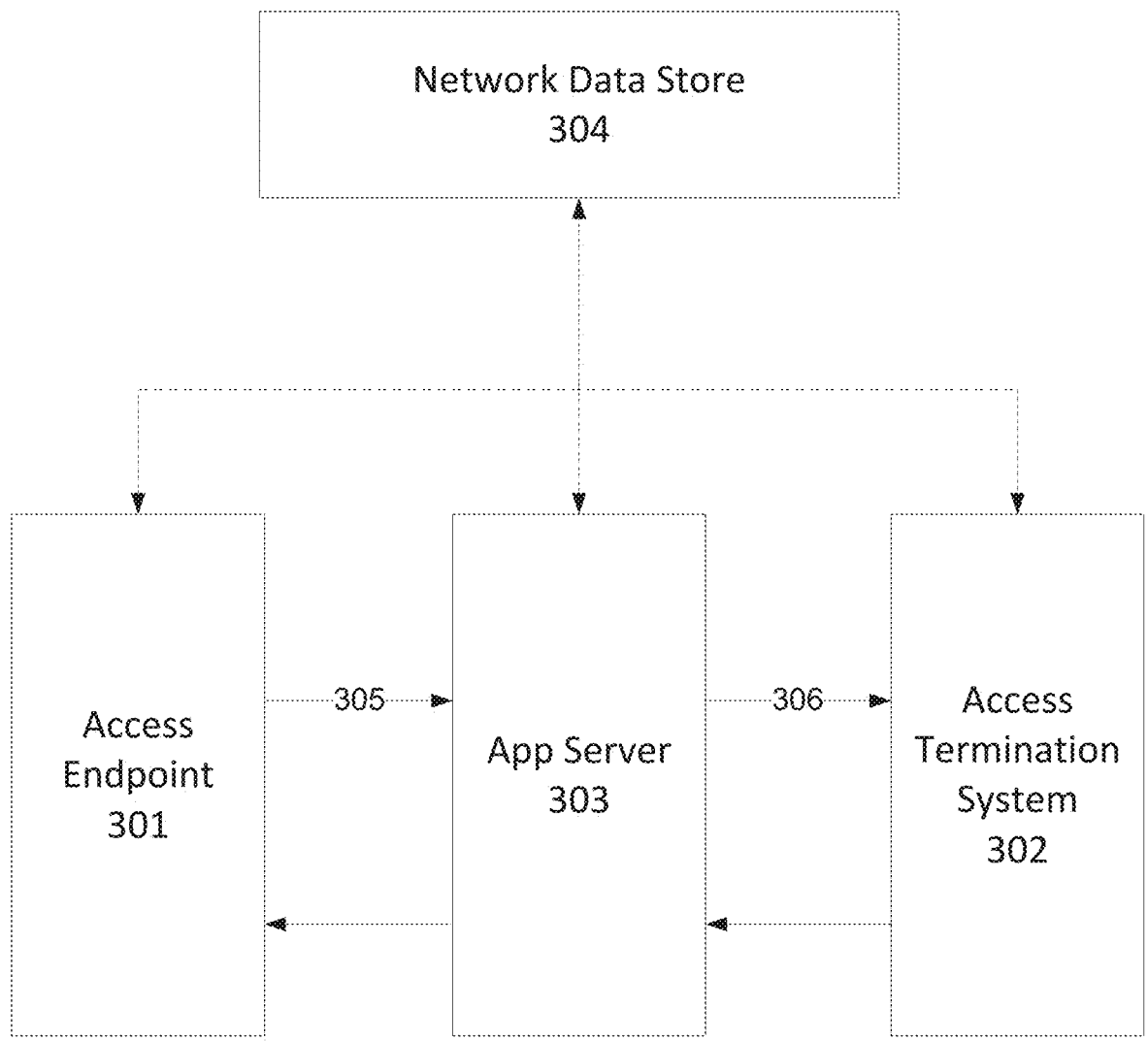
FIG. 3 shows an example network environment.

FIG. 3 is a diagram showing components and an operating environment in which various elements and/or examples described herein may be performed and implemented. The operating environment may include one or more components of the network 100. For example, the operating environment may include an access endpoint 301, such as a modem, gateway, set-top box, or consumer premise equipment (CPE). The access endpoint 301 may comprise similar elements and/or functionality as the computing device described above with respect to FIG. 2. The operating environment may also include an access termination system 302, which may comprise similar elements and/or functionality as the termination system 104 and/or the computing device 300. The operating environment may also include an application server 303, which may comprise similar elements and/or functionality as the application server 107 and/or the computing device 200.

The operating environment may also include a network data store 304. The network data store may comprise one or more computing devices, servers databases, or other suitable storage mechanisms for collecting and storing information from various elements within the network. The network data store may be implemented wholly or partially in a cloud-based infrastructure to provide real-time monitoring and data collection for access endpoints and other elements in the network.

The access endpoint 301, the application server 303, and/or the termination system 302 may communicate with the network data store to retrieve information indicating current network conditions, bandwidth availability, as well as other information that may be used to determine an appropriate QoS framework. For example, the network data store 304 may include information indicating conditions associated with one or more communication links in the network, such as the bandwidth available on a communication link between the access endpoint and the termination system. Thus, the access endpoint 301 may retrieve network information from the network data store 304 to determine whether to pre-allocate (e.g., reserve) bandwidth for a voice call or to submit a bandwidth request to the termination system 302 at the time of call setup. This determination may be made by the access endpoint based on information obtained from the data, for example, whether the bandwidth available on a particular communication link (e.g., the link between the access endpoint and the termination system) satisfies a bandwidth threshold. As shown by the element 305 in FIG. 3, to initiate a bandwidth request, the access endpoint 301 may generate an outgoing data transfer message to the application server 303 requesting bandwidth to initiate a session of a network service, such as a voice call, an on-demand viewing of a particular content item, or accessing web content via a browser. The access endpoint 301 may comprise a modem that may process the data transfer message originating from the access endpoint 301 and may transmit the message to the application server 303. The access endpoint may communicate with an external modem to process/transmit data transfer messages. If the application server 303 has received the data transfer message, as depicted by the element 306, the application server 303 may transmit a bandwidth request to the access termination system 302.

The data store 304 may request and/or retrieve information from various elements and/or devices throughout the network, such as the access endpoint 301, and store this information such that the endpoint 301 may access at a regular/periodic interval. The access endpoint 301 may receive a communication, a notification, and/or instructions from another device or network element causing the access endpoint 301 to access the network data store 304 to determine current network/link conditions. Additionally or alternatively, the access endpoint 301 may continuously access the network data store to determine current network/link conditions. The access endpoint 301 may retrieve information stored within the network data store 304 and use this information to dynamically make policy decisions and/or to request available network resources.

The information collected and stored at the network data store may be extensible for a variety of network services (e.g., voice, video, data), and may contain different types of information regarding the network resources and services made available to the user. For example, the network data store 304 may include information indicating the capabilities of one or more termination systems, and the access endpoint 301 accesses the data store 304 to retrieve network information, such as DOCSIS channel availability (e.g., DOCSIS 3.0 vs. DOCSIS 3.1), the amount of bandwidth available via a termination system, the number of available upstream/ downstream channels, or the number of channels that a network device has bonded with. As yet another example, the network data store 304 may include information indicating network capabilities and/or performance metrics, such as bandwidth, latency, uptime, distribution network load, access network load, and the like. The network data store may also include information indicating the bandwidth available over one or more communication links within the network, as well as other metrics associated with the performance/condition of one or more communication links within the network. The network data store 304 may further include information indicating the capabilities of the provisioning system, network policies (e.g., Differentiated Service Code Point classifications, priority values, precedence values, etc.), home router configurations, home router script/ code updates, network service definitions (e.g., voice service parameters, home security parameters, etc.), device utilization metrics, and other service preferences (e.g., information indicating particular advertisements and commercials to push to a particular user).

The network data store 304 may also include information indicating content consumption preferences and historical consumption data for one or more network users. The access endpoint 301 (and/or other devices in the network) may store information indicating content consumption preferences and historical consumption data of users using services in the network. For example, if a user associated with the access endpoint 301 consumes a particular television program (or VOD content item) at a particular time of day, the access endpoint 301 (or a device operatively connected thereto) may store this information in local memory and/or transmit the information to some other suitable data storage, such as the network data store 304. As will be discussed in more detail below, the access endpoint 301 may use content consumptions preferences of the user (or other users in the network) to pre-allocate or otherwise reserve bandwidth such that the access endpoint 301 (and/or a video application thereon) may more efficiently and effectively provide video services to the user for accessing the particular program at the particular time of day.

The access endpoint 301 may not have access to non-local information indicating the content consumption trends and current popularity of other programs available through the content service that may be desirable to the user. Accordingly, the network data store 304 may include information indicating particular programs, content items, channels, and the like that are popular or trending with other users in the network. For example, if several other users are using video services on the network to access content related to the Olympics, the access endpoint 301 may have access to the trending popularity of this content via the network data store 304. The popularity of a particular content item or channel may be determined in a variety of ways, for example, by determining whether the content item or channel has been (and/or is being) consumed by a threshold number of users, determining whether the rate at which users are accessing the content item or channel (via their respective devices) satisfies a threshold value, and/or determining whether the rate at which users are communicating via a social networking platform about the content item or channel satisfies a threshold value.

The access endpoint 301 may access the network data store to retrieve information indicating a user's content preference, such as the one or more television channels (and/or television programs) that are consumed/accessed by the user and/or if the user views each of those channels/ programs. The access endpoint may use information in the network data store indicating the popularity of a program or content item to determine an appropriate QoS framework to implement/establish the network service. The network data store 304 may also include information indicating the availability of a network service and/or policy for implementing/ establishing a QoS framework. For example, the network data store 304 may include timing information indicating if the access endpoint may be able to implement/establish the QoS framework for invoking voice services. The network data store 304 may also include information indicating an opt-out status for certain aspects of a network service. For example, the network data store 304 may include information indicating whether parental control features/options apply to a requested service that may prohibit the user from accessing specified video or gaming content.

The network data store 304 may be integrated with a policy server and/or network monitor that obtains network and/or termination system information. The policy server and/or network monitor may be implemented in a cloud-based infrastructure to provide real-time monitoring and data collection services to the network data store 304. Network performance metrics and termination system capabilities, such as those described above, may be retrieved from devices/nodes located throughout the network and stored at the network data store. For example, the data store 304 (and/or a network monitor) may initiate simple network management protocol (SNMP) polling to the termination system and collect information regarding current load and capabilities of the termination system. The network data store 304 may also gather network information and/or device information through database protocols, and request/ receive network policy rules and other information from a policy server. Additionally or alternatively, a network administrator may input network information and/or policy information that may be stored at the network data store 304.

The access endpoint 301 may perform load-balancing and network management functions based on network policy rules stored within the network data store 304. Accordingly, using the network information and/or policy information contained within the network data store 304, the access endpoint 301 (and other elements within the network) may serve as a distributed load-balancing network management system that uses the processing power that may be typically idle across elements/endpoints in the network. Due to the scale of the network data store 304, the access endpoint 301 may update its software and/or memory, based on data obtained from the network data store, one or more times within a time period (e.g., an hour, a day, etc.) to automatically keep current with available network information/conditions collected at the data store as well as policy information for the network. Additionally, or alternatively, the access endpoint 301 may be instructed to retrieve updated network information from the network data store 304. For example, the access endpoint 301 may be triggered remotely via a management protocol to perform the update on-demand. As another example, the access endpoint 301 may retrieve network information from the data store 304 if a threshold time period has passed since the previous update (e.g., since the device last accessed the data store). A variety of management protocols may be used to trigger the access endpoint 301 to access the network data store 304 without departing from the scope of the disclosure, such as a SNMP, a web protocol adapter (WebPA), a technical report 069 (TR-69) protocol, or any other suitable management protocol.

The network data store 304 may implement a representational state transfer ("RESTful") web interface that serves as a mechanism allowing the access endpoint 301 (and/or other elements within the network) to request/retrieve network information quickly and scalably from the network data store. The access endpoint 301 may also implement a RESTful interface to request and obtain data from the network data store 304. The RESTful interface may be tailored to provide more or less network and/or policy information, and the access endpoint may request specific information from the network data store.

The web interface may operate in one direction, allowing the access endpoint 301 to retrieve network information from the network data store 304. Additionally or alternatively, the interface may provide bi-directional functionality, thus allowing the access endpoint 301 to report network information and/or device information to the network data store 304 using telemetry or some other suitable data gathering service. For example, a telemetry service may connect to the access endpoint using a management protocol (e.g., TR-69 protocol) to gather device and/or network performance information. Additionally or alternatively, the telemetry service may connect to the access endpoint 301 to determine what activities the device has performed during a previous time period (e.g., the past 24 hours, the past two days, etc.) and to retrieve current device settings as well as current and/or past device performance metrics.

As discussed above, using the management protocol, a network management unit (e.g., central network monitor), a telemetry service, and/or a suitable web interface may collect policy and/or device information to ensure that the access endpoint 301 is operating properly. Accordingly, the network data store 304 may use the data obtained from the access endpoint 301 to determine whether devices/elements in the network are properly managing their respective data/load, and/or are whether the devices/elements are allocating bandwidth in a harmful or unexpected way based on current network parameters. If a harmful use of network resources is detected, policy rules stored in the network data store 304 may be updated to modify the operations of (and/or disable) one or more improperly functioning devices in the network.

By accessing the network data store to obtain information concerning current network/link conditions and/or policy information, the access endpoint 301 may make service impacting decisions based on the real-time availability of network resources, thus allowing the access endpoint 301 to adjust/tailor network polices and QoS based on the obtained information, rather than relying on static rules and information that may be limited to the status of the access endpoint's immediate communication link(s). By using the information contained within the network data store to make QoS determinations, the access endpoint 301 will have greater flexibility in reacting to real-time network/link conditions, network policies, or script/code updates, and thus the device may make a smarter decision on determining an appropriate QoS framework to implement/establish network services.

As will be described herein, the access endpoint 301 and other devices in the network may use information obtained from the network data store 304 to make decisions on which services to invoke, modify, and/or restrict based on real-time network and policy information. For example, in a DOCSIS network, the network services available to a user may be modified with a dynamic service update. Further, network services implemented/established by the access endpoint 301 may be controlled and/or provisioned based on information obtained from the network data store 304, such as bandwidth available on the network and/or at a termination system.

Figure 4A:
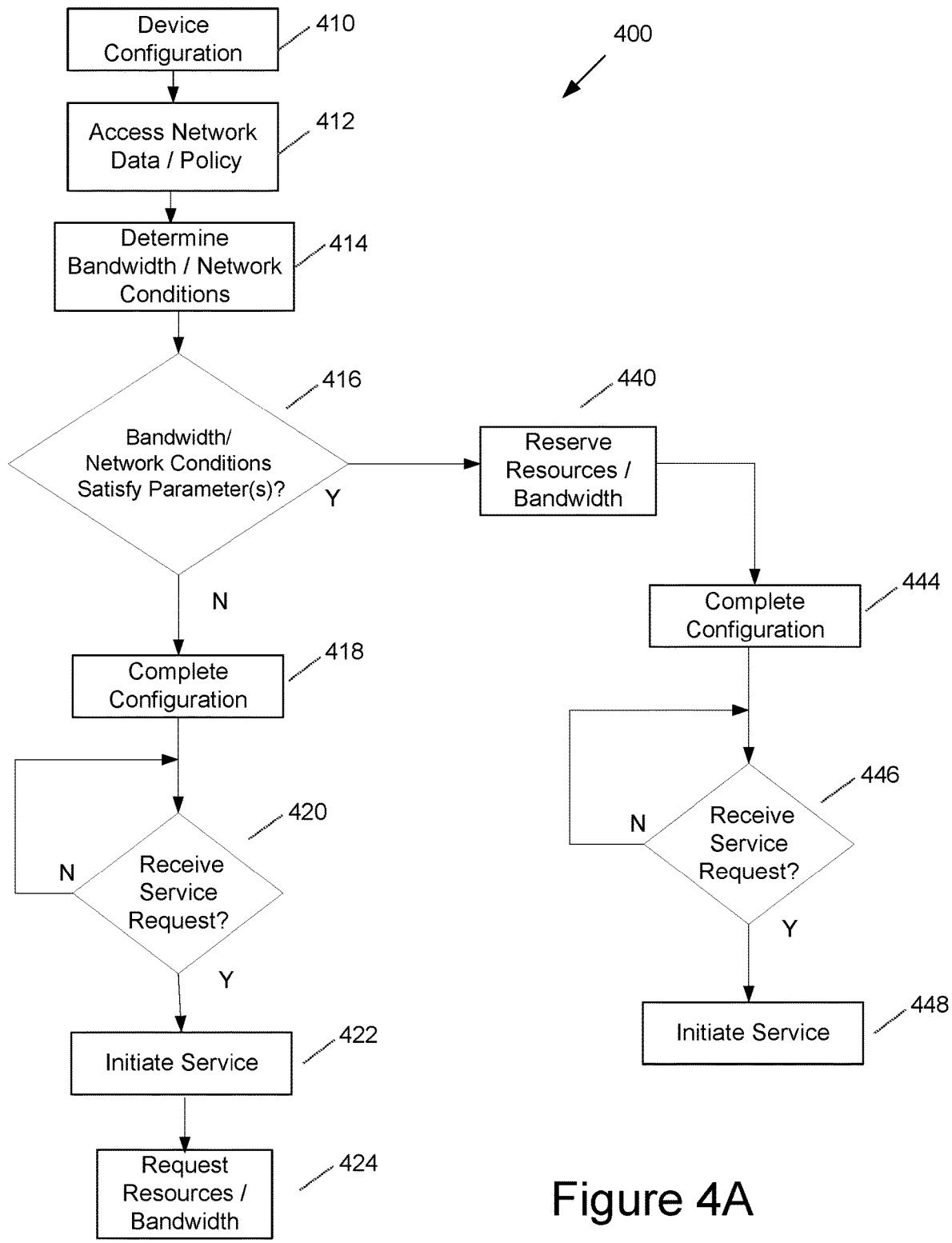
FIGS. 4A and 4B are flow diagrams of example methods for variable application and management of a quality of service framework within a network.

FIG. 4A shows an example method of variably applying and managing a quality of service framework within a network that may be performed by one or more devices connected to the communications network 100 of FIG. 1. For example, the modem 110, the gateway 111, the laptop computer 115, the personal computer 114, or the set top box/DVR 113, may perform some or all of the described steps. Computer-executable instructions may be stored in a computer-readable medium, such as a non-transitory computer readable medium, and may be executed by one or more processors to cause one or more of the aforementioned computing devices (and/or other computing devices) to perform one, some or all of the steps of method 400. The steps in FIG. 4A need not all be performed in the order specified and some steps may be omitted or changed in order. The techniques described below for FIG. 4A may be performed by a first computing device, but for ease of description, the first computing device will be referred to as simply "the computing device."

At step 410, the computing device may initiate a device configuration process. Typically, if the computing device is powered on, a series of transactions occur between the device and other devices/elements within the network, such as the termination system. For example, the computing device may comprise a cable modem that performs a variety of DOCSIS protocol communications with the termination system, such as searching for a valid downstream DOCSIS channel and synchronizing operations with the termination system, obtaining upstream transmit parameters from the termination system (e.g., media access protocol messages) and performing ranging operations and adjustments (e.g., frequency, amplitude, timing offset, pre-equalization, etc.) with the termination system. Additionally, the computing device may synchronize the time of day with the termination system and/or retrieve configuration files. A configuration file may, for example, be retrieved from a Trivial File Transfer Protocol ("TFTP") server and contain operational parameters the computing device may need for QoS and to provide network services. The configuration file may include information indicating a QoS framework for implementing/establishing services over the network. As will be discussed in more detail below, one or more steps of the method shown in FIG. 4A may occur during the device configuration process.

At step 412, the computing device may access a network data store to obtain network information and/or policy information. The computing device may represent a single endpoint in the network, and as such, there may only so much network information that the computing device may obtain from local devices, such as devices and network elements that may be directly connected to the computing device via communication links within the network. The computing device may communicate with another device, a database, or some other suitable data storage, to request information regarding the network, communication links therein, network policy, as well as network services that may be available to a user. For example, referring to FIG. 3, access endpoint 301 may periodically access the network data store 304, during the device configuration process, to assess current network/link conditions and determine a QoS framework to invoke (e.g., whether to pre-allocate or reserve bandwidth for a particular service, whether to dynamically request bandwidth on-demand, e.g., a per-session basis). The computing device may access the network data store if the device configuration processes has completed.

At step 414, the computing device may determine current network conditions. The computing device may determine current network conditions based on information obtained from the network data store and/or other devices/end points in the network, and may use this information to determine a QoS framework for implementing/establishing network services. For example, the computing device may query the network data store for information indicating an amount of bandwidth available on one or more communication links within the network. The computing device may query the network data store for information indicating an amount of bandwidth available on a communication link at the computing device, or the bandwidth available at a termination system (or any other computing device) connected to the computing device. The computing device may query another computing device, which is operatively connected to the computing device, for information indicating an amount of bandwidth available on one or more communication links within the network.

The computing device may request/retrieve various types of information from the network data store and/or other computing devices (or network devices) to determine current network conditions. Examples of such information may include information indicating network policy, current and/or historic latency conditions within the network, other current and/or historic network performance metrics, a number of other computing devices and/or endpoints within the network, channel availability within the network, the DOCSIS system version being implemented (e.g., DOCSIS 3.1 vs DOCSIS 3.0), and/or the particular access technology used by the network (e.g., DSL, DOCSIS, Fiber, ISDN, etc.). The computing device may access a user's content consumption history and/or device utilization history to determine one or more television channels/programs that are frequently viewed by the user, the times of day in which the user has accessed/consumed those particular channels/programs, as well as other information relating to the user's use of the device. As described below, the computing device may use information obtained from the network data store and/or other network devices to determine a QoS framework for providing network services.

At step 416, the computing device may determine whether current network conditions satisfy one or more parameters (and/or groups of parameters) for pre-allocating (e.g., reserving) bandwidth and/or other network resources to implement/establish network services. The parameters may be stored in memory or some other suitable storage, for later access by the computing device or other devices in the network. The computing device may access and compare the parameters to information obtained from the network data store and/or other network devices. The parameters may be defined in one or more policy rules stored within the network data store or some other suitable data storage. A network administrator may input information into the network data storage indicating the one or more parameters (or groups of parameters) for the computing device to consider if making a determination at step 416. Additionally, or alternatively, the computing device may obtain one or more parameters from the network data store indicating whether the computing device may reserve bandwidth for particular network services prior to those services being invoked.

As discussed above, the computing device may determine if networking conditions warrant the pre-allocation of bandwidth for implementing/establishing network services (e.g., voice call, on-demand video, gaming), rather than waiting to dynamically request bandwidth at the time the service may be requested/invoked (e.g., during the voice call setup). Parameters for enabling the computing device to request a pre-allocation of bandwidth (or other network resources) may vary over time and may be modified by a network administrator. For example, the network administrator may interact with an interface (e.g., RESTful interface) to provide input/information indicating specified parameters and/or to make modifications to parameters.

The parameters considered by the computing device at step 416 may be adjusted/tailored based on a variety of factors. Examples of such factors may include, but are not limited to user/device geographic location, user consumption/utilization preferences, and/or current network/link conditions. For example, the computing device may determine whether the amount of bandwidth available on the network (and/or on one or more communication links) satisfies a first bandwidth threshold. Additionally or alternatively, one or more of the parameters (and/or groups of parameters) considered by the computing device may indicate/reflect heightened network resource requirements for reserving further bandwidth or network resources. For example, the computing device may compare network conditions to a first parameter indicating a first bandwidth threshold that, if satisfied, enables the computing device to pre-allocate a first amount of bandwidth for the network service. Additionally, the computing device may compare current network conditions to a second parameter indicating a second (higher) bandwidth threshold that, if satisfied, enables the computing device to pre-allocate an additional amount of bandwidth for the network service. The parameters may be adjusted by a device or element within the network based on current network conditions and/or policy information. For example, if the bandwidth available on the network (and/or a particular communication link) increases, the parameter bandwidth threshold may be dynamically adjusted downward by the computing device and/or one or more other devices/elements in the network.

The computing device may determine whether to pre-allocate (e.g., reserve) bandwidth for implementing/establishing network services based on information indicating a geographic location and/or network location of the computing device (and/or other network elements) to adjust one or more parameters, such as a bandwidth threshold. For example, the computing device may determine that the available bandwidth for a network comprising a first region of New York City is restricted, and as such, bandwidth threshold parameters stored in the network data store may be modified to reflect these changes in local network conditions, such as by increasing bandwidth thresholds. Computing devices and/or access endpoints located in the first region of New York, if accessing the network data store, may retrieve updated policy information and network conditions for their respective geographic area. As such, to determine whether to pre-allocate bandwidth, the computing devices located in the first region of New York may need to satisfy a heightened bandwidth threshold, as compared to computing devices in other geographic reasons, before pre-allocating bandwidth to provide network services. Additionally, or alternatively, timing information (e.g., time of day, day of week, etc.) may be used to adjust a parameter (e.g., bandwidth threshold). The computing device may retrieve information from the network data store indicating that bandwidth on the network is less available during the weekend and/or during particular time periods throughout the day (e.g., from 8:00 am-10:00 am, from 7:00 pm-9:00 pm, etc.). As such, bandwidth threshold parameters for the computing device may be adjusted upward during the weekend and/or during particular times of the day if bandwidth is less available.

The computing device may determine whether to request a pre-allocation of bandwidth and/or other network resources based on an oversubscription rate/factor within the network. A service within the network may become oversubscribed if more users are attempting to use/access the service than there is bandwidth capable of fulfilling each request. In this example, if the oversubscription rate within the network satisfies an oversubscription threshold (e.g., a threshold rate/factor), the method may proceed to step 418. However, if the oversubscription rate within the network does not satisfy the oversubscription threshold, the method may proceed to step 440.

The computing device may determine whether to request a pre-allocation (e.g., reservation) of bandwidth based on the number and/or availability of DOCSIS channels within the network (or on one or more communication links). For example, if the channel availability is as prescribed by DOCSIS 3.1 or higher, the method may proceed to step 440. In this example, implementation of a higher DOCSIS version may indicate, to the computing device, increased access to network resources and bandwidth availability as compared to lower DOCSIS versions. However, if the channel availability is as prescribed by DOCSIS 3.0 or lower, the method may proceed to step 418.

Figure 6A:
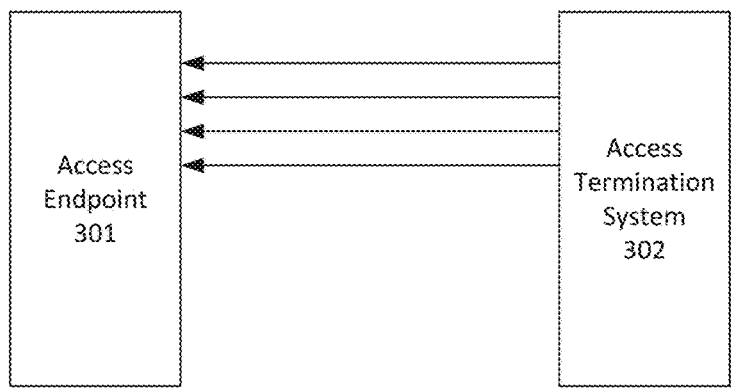
FIGS. 6A and 6B are diagrams showing examples of components that may be utilized within a method for variably applying a quality of service framework within a network.

As another example, if the number of DOCSIS channels available between the computing device and a termination system satisfies a threshold value, the computing device may pre-allocate bandwidth to implement/establish the network service (e.g., a voice call). FIG. 6A is an example diagram depicting available channels for communicating data between the access termination system 302 and the access endpoint 301. As described above, to determine whether to pre-allocate bandwidth for a voice call prior to the call setup time, the computing device may determine if an amount of bandwidth available on the network satisfies a bandwidth threshold. The example shown in FIG. 6A depicts four communication channels between the access endpoint 301 and the access termination system 302. Each channel may provide upstream and/or downstream data transmission capabilities, and as such more channels between the termination system and endpoint may lead to increased bandwidth for transmitting voice data. Here, a bandwidth threshold may be defined by the number of channels available between the access endpoint and a termination system. If the bandwidth threshold is set at five (5) channels, at step 416, the computing device (e.g., the access endpoint 301) may determine that the bandwidth threshold is not satisfied, and thus the method may proceed to step 418.

Figure 6B:
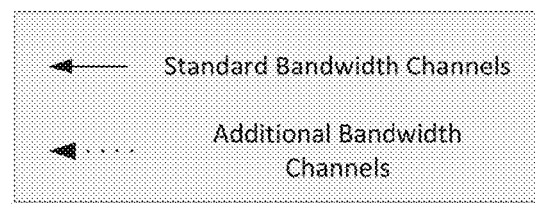
Figure 6B:
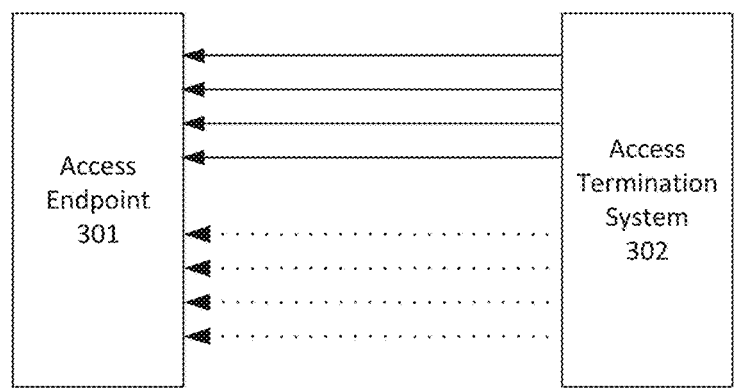

As described above, the computing device may periodically access the network data store to determine whether to pre-allocate bandwidth for implementing/establishing a network service, such as a voice call. Referring now to FIG. 6B, in this example, additional channels are now or have become available between the access termination system 302 and the access endpoint 301. As such, due to the increased bandwidth available on the network, if the bandwidth threshold is still set at five (5) channels, the computing device may determine that the bandwidth threshold is satisfied and may reserve bandwidth for implementing/establishing the voice call prior to the call being initiated/invoked.

At step 416 (FIG. 4A), the parameter(s) considered by the computing device may also vary based on the type of network service being provided, as well as the manner or network policy in which the computing device generally implements/establishes a QoS framework for that service. For example, with respect to certain services offered via the network (e.g., voice services), the system may request bandwidth at the time the user attempts to use the service (e.g., make a voice call). The computing device may transmit, via an application server, a bandwidth request to a termination system in the network. In this example, the parameters for pre-allocating bandwidth (e.g., the DOCSIS channel availability) allows the computing device to determine whether to reserve bandwidth in advance of the user making the voice call, rather than dynamically requesting bandwidth at the time of call setup.

The one or more parameters considered by the computing device may also be used for other network services, such as data and video services. Additionally, such parameters may also be used to make pre-allocation determinations for network services in cases where the computing device generally reserves bandwidth in advance of the service being invoked, for example, pre-allocating bandwidth for video services in advance of the user requesting/invoking a video-on-demand "VOD" session. In this example, the computing device may determine whether to request a pre-allocation (e.g., reservation) of bandwidth for later VOD sessions based on one or more parameters and/or groups of parameters, such as the availability of DOCSIS channels on the network and/or the amount of bandwidth available between the device and a termination system. The parameter(s) for pre-allocating bandwidth (e.g., the DOCSIS channel availability) allow the computing device to determine whether to dynamically request bandwidth at the time a VOD session is invoked, for example if network resources are more restricted, rather than reserving bandwidth in advance of the user requesting/initiating the VOD session—in accordance with the general QoS framework for implementing/establishing video services.

Parameters considered by the computing device may also be established based on a frequency and/or total number of instances in which the user used particular services within a time period and/or how those services were used. For example, the computing device may determine whether to request a pre-allocation of bandwidth for particular callees (e.g., voice services), particular channels/programs (e.g., video services), and/or particular webpages/websites (e.g., data services) based on information contained in the network data store (or other suitable data storage) indicating a frequency and/or a number of instances in which the user has previously used such services.

As an example, the network data store may include information indicating one or more callees that a user (e.g., the caller) has called most often over a certain time period. The network data store may also include timing information indicating particular times of day each callee was called, as well as other metrics indicating a frequency in which calls were made to one or more callees and the corresponding time each call was made. In this example, a parameter for pre-allocating (e.g., reserving) bandwidth for voice services in advance of the service being invoked may comprise a threshold number of instances the user called the callee during a time period and/or a threshold frequency with which the user called the callee during a time period. If the computing device determines that a call frequency threshold has been satisfied, the method may proceed to step 440 where the computing device may request a pre-allocation of bandwidth for a voice application implementing/establishing voice calls.

Additionally, or alternatively, the computing device may request a pre-allocation of bandwidth for voice calls made to a particular callee, group of callees, and/or particular devices based on information obtained from the network data store. If the computing device determines that the call frequency threshold has not been satisfied, the method may proceed to step 418 where the computing device may complete the device configuration process, and may request a bandwidth allocation for the voice application at the time the user attempts to call a callee (e.g., at the time of call setup). As another example, the network data store may include information relating to a user's use of video services, such as data indicating one or more channels (and/or content items) that the user has accessed over a certain time period (e.g., one day, one week, one month). The network data store may also include timing information indicating the particular times of day each channel was accessed by a device (e.g., the computing device) as well as other metrics indicating the frequency in which particular channels were accessed and the time each channel was accessed.

As described above, the QoS framework for implementing/establishing certain network services (e.g., video services, gaming services) may differ from that of voice services in that the computing device may generally pre-allocate (e.g., reserve) bandwidth for providing video services in advance of the video service being invoked, while bandwidth for voice services may generally be requested at the time a voice service is invoked. However, by obtaining current network conditions and comparing this information to dynamic parameters generated in view of updated/current network policies and/or QoS framework, the computing device may make more informed decisions as to the appropriate QoS framework for implementing/establishing a network service notwithstanding any standard framework generally used to implement/establish that service. For example, a parameter for determining whether to pre-allocate (e.g., reserve) bandwidth for video services in advance of the video service being invoked may comprise a threshold number of instances the user accessed a channel (or content item) during a time period and/or a threshold frequency with which the user (and/or a particular device) accessed the channel during a time period. If the frequency threshold is not satisfied, the method may proceed to step 418 where the computing device may complete device configuration process and/or subsequently may request a bandwidth allocation for the video application at the time the user attempts to access a particular channel or content item. However, if the frequency threshold is satisfied, the method may proceed to step 440 where the computing device may request a pre-allocation of bandwidth for implementing/establishing the video service.

The parameters considered by the computing device for other network services (e.g., data, video) may also be adjusted/tailored based on a variety of factors. Examples of such factors may include user consumption preferences and/or device utilization preferences. The computing device may determine whether to pre-allocate bandwidth for video services based on a user profile of the user requesting the video content and/or other users that have requested the video content. For example, information indicating user preferences, demographic information, content favorites, and other information may be stored at the network data store or otherwise accessed by the computing device to determine particular content items and/or times of day the user may likely consume the content item. The computing device may use this information to pre-allocate bandwidth for video services, at the appropriate time of day, such that the computing device may quickly and more efficiently provide the user with access to the content item, rather than requesting bandwidth to implement/establish the video service at the time the user attempts to access the content item.

The computing device may determine whether to pre-allocate bandwidth for video services in advance of the video service being invoked based on a device profile of the computing device attempting to invoke the video service. For example, the network data store may include information indicating an amount of data consumed by the computing device to implement/establish one or more network services over a time period (e.g., 1 hour, 1 day, 1 week, a billing cycle). The computing device may access the network data store to obtain device utilization metrics, as well as current network policy to determining whether to pre-allocate bandwidth for a particular session of the network service. For example, based on current network policy and to prevent computing devices from monopolizing network resources, a parameter may be established indicating a threshold amount of data (e.g., gaming data, video data) that a computing device may consume within a day. At step 416, the computing device may use device utilization data obtained from the network data store and compare this information (and/or other network information) to the data threshold parameter to determine whether to pre-allocate bandwidth for a session of the network service (e.g., a voice call, a VOD viewing of a content item, a video game session).

As described above, the network data store may include information indicating one or more web pages, websites, or web-based applications (e.g., video games, data streaming services, etc.) that the user (or a particular device, such as the computing device) has accessed most often over a certain time period, as well as timing information indicating the particular times of day each website and/or or web-based application was accessed, or other metrics indicating a frequency with which particular websites and/or or web-based applications were accessed. The computing device may use this information to request a pre-allocation of bandwidth for particular web pages, websites, or web-based applications. A parameter for pre-allocating (e.g., reserving) bandwidth for data services in advance of the data service being invoked may comprise a threshold number of instances that a particular webpage was accessed during a time period and/or a threshold frequency with which the webpage was accessed during a time period.

Any combination of parameters may be used to establish policy for determining whether the computing device may request a pre-allocation of bandwidth for implementing/establishing a network service. For example, a network administrator may establish policy indicating that a bandwidth threshold must be satisfied prior to requesting a pre-allocation of bandwidth on the network. Additionally or alternatively, policy may require that a bandwidth threshold and a particular DOCSIS channel threshold must be satisfied prior to requesting a pre-allocation of bandwidth on the network. Threshold values for these parameters (or groups of parameters) may also be established through network policy and may be dynamically modified based on current/historical network conditions, policy rules, and/or device scripts.

At step 416, the computing device may store in memory an indication of the quality of service framework being implemented. For example, the computing device may store in memory (or other suitable data storage such as the network data store) an indication that a PCMM-based framework may be implemented, and may access the memory to determine a current QoS framework based on this stored indication. The computing device may transmit data indicating an updated/current QoS framework to another device or some other suitable data storage, such as the network data store. By periodically obtaining and assessing current network policy/conditions, the computing device may tailor the QoS framework for implementing/establishing network services, thus allowing the user to provide a user with improved access to network services by effectively reducing service setup time.

At step 420, the computing device may determine whether a particular service has been requested. For example, the computing device (e.g., voice device) may determine whether it has received a request to initiate a voice call. As noted above, the service(s) requested/invoked by the computing device may extend beyond the voice services example depicted in FIG. 4A, and may include a variety of other services such as data services, video services, and the like. If the computing device determines that a service has not been requested, the method may return to step 420 and the computing device may continue to monitor for service requests. If the computing device determines that a service has been requested, the method may proceed to step 422.

At step 422, the computing device may initiate the service requested at step 420. A service application invoking the voice service (e.g., voice call) may embedded within the computing device (e.g., VOIP device). The service application may determine the appropriate QoS framework for implementing/establishing the voice call and whether any bandwidth has been allocated to perform the requested voice service. For example, the computing device (and/or service application) may communicate with an application server to determine whether bandwidth has already been reserved/allocated for implementing/establishing the voice service. As another example, the computing device may access its memory or another suitable data storage (e.g., the network data store) to determine the appropriate QoS framework and whether any bandwidth has been pre-allocated (e.g., reserved) to perform the requested voice service.

At step 424, the computing device may request bandwidth (and/or other network resources) for the service initiated at step 422. For example, under a PCMM-based framework where a bandwidth request may be made at the time the session is invoked (e.g., at the time of call setup), the computing device may transmit a data transfer message to an application server to request bandwidth for the service (e.g., voice call).

As discussed above, the computing device may generally implement/establish a QoS framework for voice services where bandwidth is requested at the time of call setup. Referring back to steps 416 and 418, since network conditions are not sufficient to warrant a pre-allocation (e.g., reservation) of bandwidth prior to a service being invoked (e.g., the amount of available bandwidth was below a specified bandwidth threshold), the computing device may determine that a PCMM-based framework may be used to implement/establish QoS for the voice service requested at step 420. Thus, during call setup, the computing device may communicate one or more data transfer messages to a voice application server (e.g., app server 107) to request bandwidth for the voice call.

As the voice application server processes the data transfer message, because the data transfer message has not been modified to include indicators signaling the application server to not make an on-demand (e.g., per-session) bandwidth requests, the application server may transmit, to the termination system, a bandwidth request on behalf of the computing device for the voice service initiated at step 422 (e.g., the voice call). If the bandwidth request has been granted, the computing device may use the granted bandwidth to implement/establish the voice service requested at step 420 and/or initiated at step 422. Additionally, or alternatively, the computing device may continue to dynamically request bandwidth to be used by voice service applications on an as needed basis until the computing device determines/detects that prevailing network conditions/policies satisfy current parameters for pre-allocating bandwidth, and/or the computing device determines that a different service (e.g., a data service, video service) has been requested.

Referring back to step 416 in FIG. 4A, if the network conditions satisfy the one or more specified parameters, the method may proceed to step 440. For example, if the computing device determines that the amount of bandwidth available on the network satisfies the bandwidth threshold, the method may proceed to step 440.

At step 440, the computing device may request a pre-allocation of bandwidth for one or more sessions of a network service and/or for invoking service applications. The computing device may store in memory an indication of the quality of service framework to be implemented given that specified parameter(s) were satisfied by current network conditions (e.g., the amount of bandwidth available on the network satisfied a bandwidth threshold). For example, at step 440, the computing device may store in memory or other suitable data storage, such as the network data store, an indication that the computing device may implement/establish a QoS framework to pre-allocate (e.g., reserve) bandwidth for voice services prior to a voice call being invoked. The computing device may store in memory an indication of the quality of service framework to be implemented. Additionally or alternatively, the computing device may transmit data to another device or network element indicating the updated/current QoS framework to be implemented.

As described above, under a PCMM-based framework, data transfer messages may be communicated from the computing device to a voice application server during call setup to trigger the server to make a bandwidth request through to a termination system. However, if the computing device determines at step 416 that a pre-allocation of bandwidth may be warranted (e.g., voice service), the computing device may transmit a reservation request to pre-allocate (e.g., reserve) bandwidth for implementing/establishing one or more voice calls in advance of the voice service (and/or a voice application) being invoked. The computing device may transmit the reservation request to a second computing device that is communicably connected to the computing device. In this example, the computing device may have determined, as discussed above with respect to step 416, that the amount of bandwidth available on the network (and/or the amount of bandwidth between the computing device and the second computing device) satisfies the bandwidth threshold. The computing device may transmit the reservation request to a third computing device that is communicably connected to the computing device. In this example, the computing device may have also determined, as discussed above with respect to step 416, that the amount of bandwidth available on the network (and/or the amount of bandwidth between the computing device and the second computing device) satisfies the bandwidth threshold.

As will be described further below, because the computing device determined that a pre-allocation of bandwidth may be warranted for implementing/establishing the voice service, at service invocation time (e.g., step 448), the computing device, knowing that it may have already pre-allocated (e.g., reserved) bandwidth for invoking the network service, may modify outgoing data transfer messages such that the application responding to the service request (e.g., step 446) may know that the application server (e.g., the application server 107) may not need to request bandwidth on behalf of the computing device. The computing device may modify the data transfer message in a variety of ways, for example, by modifying a SIP header of the message, such as a P-Access-Network-Info header, to include an indicator signaling that the application server should not request bandwidth at the time a voice call is invoked. The computing device may receive a response from the termination system (and/or another network element, such as the application server) indicating that the requested bandwidth has been granted.

At step 444, the computing device may complete the device configuration process initiated at step 410. In some examples, the computing device may complete the device configuration process prior to step 444. As noted above, to provide a service on the network (e.g., a voice call), data may be transmitted along upstream/downstream channels such that voice packets and other information may be communicated between various nodes within the network. However, because several devices within the network may attempt to send data on a particular channel (e.g., an upstream channel), a device may request bandwidth on the upstream channel to transmit data.

At step 446, the computing device may determine whether a particular network service has been requested. For example, the computing device may determine whether it has received a request to invoke a voice call. Additionally, or alternatively, a voice application, either integral to or remote from the computing device, may signal to the computing device that a service request has been received. As noted above, the service(s) requested by the computing device may extend beyond the telephony example depicted in FIG. 4A, and may include a variety of other services. Examples of such services may include data services (e.g., web surfing, video gaming, etc.) and video services (e.g., video-on-demand). If the computing device determines that a service has not been requested, the method may return to step 446 and the computing device may continue to monitor whether a session of a network service is requested/invoked. If the computing device determines that a service has been requested, the method may proceed to step 448.

At step 448, the computing device may initiate the service requested at step 446. The computing device may initiate the service request in response to signaling from a service application that received the service request step 446. At step 448, the computing device may modify data transfer messages transmitted to an application server to signal the application sever to not request bandwidth for the network service session requested at step 446.

Referring to the example described above where a voice call is invoked, the computing device may respond to a request to initiate the voice call by initiating a voice call setup process. A voice application may include one or more indicators in the call setup message (e.g., data transfer message) indicating to the voice network, and also the application server, that the general QoS framework for requesting bandwidth (e.g., dynamically requesting bandwidth at call setup time) should not be invoked. Instead, the computing device may use previously allocated/reserved bandwidth (e.g., bandwidth reserved at step 440) to implement/establishing the voice call.

Figure 4B:
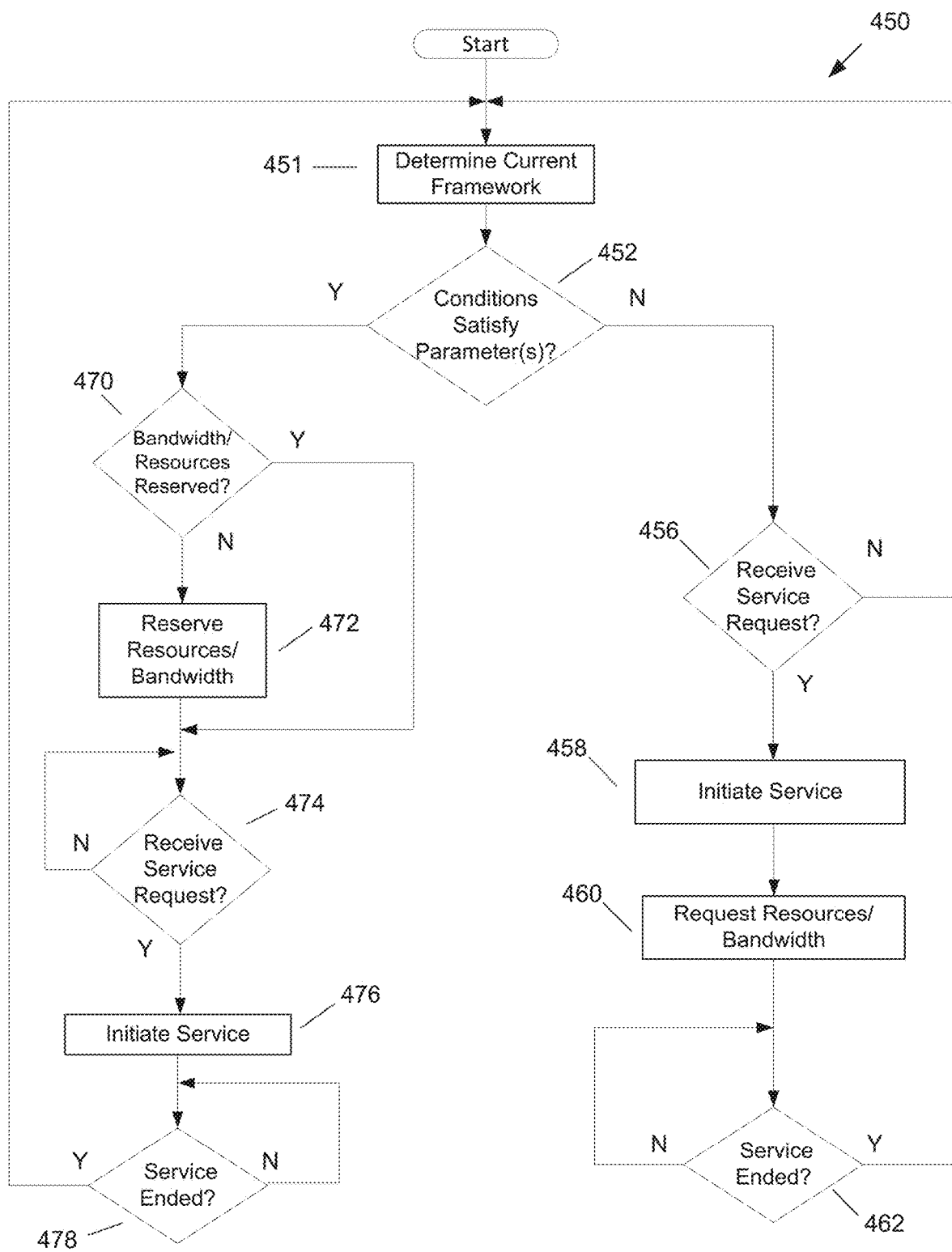

As described above, the methods shown in and described with respect to FIGS. 4A and 4B may be implemented by one or more components of the network, such as the computing device described above, for determining the allocation and/or reservation of upstream bandwidth/resources. The computing device may use the method described above to reserve/allocate downstream network resources. Additionally, or alternatively, the methods shown in and described with respect to FIGS. 4A and 4B may be implemented by a computing device for determining the allocation and/or reservation of bandwidth/resources in upstream and/or downstream channels. By periodically or regularly accessing a network data store to determine network conditions, including the conditions of one more communications links throughout the network, the computing device may make a more informed decision as to whether and/or when bandwidth (or other network resources) may be allocated for particular service applications.

The computing device may use the process of variably applying a QoS framework based on current network conditions, as described above with respect to FIGS. 4A and 4B, to determine whether and/or when to allocate other network resources. For example, the computing device may detect, based on information obtained from the network data store, that a particular communication link in the network may be performing poorly (e.g., low bandwidth). Thus, if reserving network resources for a network service session, the computing device may allocate a cache on the appropriate side of the communication link indicating consumer preference information (e.g., data indicating a particular website or webpage frequented by the user, data indicating a particular content item consumed by the user, data indicating a particular callee contacted by the user) such that the computing device may pre-allocate the network resource on the appropriate side of the network issue to provide a better experience and higher quality of service to the user. For example, if the user visits a particular news webpage every morning and there is a spotty connection on a communication link between some network element and the server hosting the news webpage, the computing device may cache the webpage data and mirror the webpage to a server (or other element) on the network that may be accessed by the computing device using communication links having increased (and/or pre-allocated) bandwidth, and thus avoid the spotty connection on the communication link.

The computing device may use information obtained from the network data store and/or other network devices to determine a particular service application to use if accessing information in the network and/or implementing/establishing a network service. For example, a user may have the option to choose from a variety of services that allow the user to access particular VOD content made available on the network. A user desiring to access a television program on-demand using the computing device may choose a particular VOD service (e.g., Hulu, Roku, Netflix, etc.) to view the program. By using information contained in the network data store to assess the various network/link conditions to the servers for the various VOD services/applications, the computing device may determine which VOD service to use to efficiently access the desired VOD content. For example, if the user may access a particular episode of "Law & Order" using either Hulu or Roku services, the computing device may access the network data store to determine that the bandwidth to Roku is poor at the moment, and thus if the user attempts to use the Roku video application to access the television program, the computing device (and/or another device in the network) may notify the user to use a different application. In an example, the computing device may determine one or more other applications that have increased bandwidth for accessing the desired content/information. In another example, the computing device may generate a recommendation, based on information stored in the network data store, for a video application having increased bandwidth for accessing the desired content/information. The computing device may display, in a message to the user, a recommendation for a particular video application to use if attempting to access the content.

The computing device may use information stored in the network data store to determine an optimal (and/or maximum) speed for transmitting data over one or more communication links within the network. For example, if the user has a data service that provides speeds up to 100 MBps, and the computing device attempts to access a portion of the network that may be currently experiencing issues and thus incurs increased latency for speeds over 50 MBps, the computing device may set its speed to 50 MBps to transmit data within that particular portion of the network. This may be accomplished, for example, by the computing device accessing information in the network data store and/or accessing network policy indicating that the device may use a particular speed to transmit data via certain portions of the network. The computing device may determine that its current data speed may not meet a parameter for transmitting data over the particular portion of the network, and as such, may adjust its data speed for transmitting data via the particular communication link(s) in accordance with current network policy.

Accordingly, by regulating data speeds to transmit data via the particular portion of the network, the user may experience less latency than they may otherwise incur if the computing device attempted to transmit data at a speed over 50 MBps. Once the issues are corrected for that particular portion of the network, updated policy information may be stored within the network data store indicating that the computing device may transmit data at regular speeds within the particular portion of the network that was previously experiencing issues. Thus, if the computing device subsequently access the network data store, the computing device may receive the updated policy and adjust its data speeds accordingly. Additionally, or alternatively, the computing device may receive an alert from another device or element in the network indicating that the issue has been fixed, and thus, the computing device may begin transmitting data at speeds of 100 MBps within the previously affected portion of the network.

Having discussed an example method of variably applying and managing a quality of service framework where a pre-allocation of resources/bandwidth may be made during the device configuration process, discussion will now turn to a method, apparatus and/or system according to one or more examples where the resource/bandwidth pre-allocation determination may be made, as shown in FIG. 4B.

Method 450 may be performed by any computing device 200 connected to the communications network 100 of FIG. 1. Portions of the method 450 may be performed by components of the network 100. Computer-executable instructions may be stored in a computer-readable medium, such as a non-transitory computer readable medium, and may be executed by one or more processors to cause one or more of the aforementioned computing devices (and/or other computing device) to perform one, some or all of the steps of method 450. The steps in FIG. 4B need not all be performed in the order specified and some steps may be omitted or changed in order.

At step 451, the computing device may determine the quality of service policy/framework for implementing/establishing services within the network. The computing device may access a memory or some other suitable data storage, such as the network data store discussed with reference to method 400, to determine the current QoS framework for implementing/establishing various network services (e.g., voice, data, video). Additionally or alternatively, the computing device may request, from another device and/or network element, data identifying the current QoS framework.

The computing device may determine the current QoS framework based on a network service that is being (or has been) implemented/established by the computing device. As noted above, the computing device may implement/establish a QoS framework based on current network conditions and the network service sessions being invoked. For example, if network conditions do not satisfy specified parameters (e.g., available bandwidth is below a specified threshold), the computing device may implement/establish a general QoS framework for voice services, such as a PCMM-based framework, wherein bandwidth is requested to invoke a voice call at the time of call setup. This framework for voice services may be modified and/or adjusted based on current network policy.

The computing device may use different parameters or groups of parameters to determine whether to implement/establish different network services. For example, a first bandwidth threshold may be established to determine a QoS framework for implementing/establishing for voice services while a second threshold may be established to determine a QoS framework for implementing/establishing video services. Additionally, network policy indicating the QoS framework to implement for a particular network service may be stored at the network data store or other suitable data storage, and this framework may be adjusted/tailored by network administrators based on a variety of factors, such as device location, current network conditions, user preferences, timing information, and the like.

The computing device may determine the network service that was (or is being) implemented by the computing device. For example, the computing device may access memory (or other suitable data storage) to determine whether bandwidth has been pre-allocated (e.g., reserved) to implement/establish a particular service (e.g., a voice call, data services, video services). In this example, if bandwidth has already been pre-allocated for implementing/establishing the voice call, the computing device may not need to request bandwidth at the time of call setup if receiving a request to initiate a subsequent voice call. As another example, the computing device may access a memory or other suitable data storage to determine a last session of the service initiated by the device. The computing device may use information indicating a current or previous network service implemented/established by the computing device to determine the current QoS framework at step 451. Additionally or alternatively, method 450 may be performed without first determining the current framework being implemented/established by the computing device.

At step 452, the computing device may determine whether one or more parameters (or groups of parameters) may be satisfied by current network conditions. The computing device may obtain network/link conditions, network information, policy information, and/or other information from another device, a network data store, or other suitable data storage to make this determination. At step 452, the computing device may perform one or more of the operations discussed above with respect to step 416 of method 400. For example, at step 452, the computing device may determine whether current network conditions satisfy parameters for pre-allocating (e.g., reserving) bandwidth and/or other network resources for voice services in advance of the service being invoked/initiated. If the computing device determines that the current network conditions satisfy the parameters, the method may proceed to step 470.

At step 470, the computing device may determine whether bandwidth and/or other network resources have been reserved or pre-allocated for one or more network services. For example, the computing device may query the network data store and/or another device in the network (e.g., a termination system, a network device) to determine whether bandwidth has already been reserved for implementing/establishing a voice call. As another example, the computing device may query its local memory or some other suitable data storage in the network to determine bandwidth has already been reserved for the network service. As described above with respect to step 440 in FIG. 4A, the computing device may pre-allocate bandwidth for implementing/establishing one or more sessions of a network service based on current network conditions. In the example shown in FIG. 4B, if bandwidth has already been reserved for the network service (e.g., voice service) the computing device may not request an additional pre-allocation of bandwidth to implement/establish the service, and the method may proceed to step 474. If the computing device determines that bandwidth and/or other network resources have not been reserved or pre-allocated for the service, the method may proceed to step 472.

At step 470, the computing device may determine whether sufficient bandwidth and/or other network resources are available on the network to warrant an additional pre-allocation (e.g., reservation) of bandwidth and/or other resources for implementing/establishing the service. For example, the computing device may determine whether current network conditions satisfy one or more additional parameters corresponding to heightened network resource requirements for reserving additional bandwidth, such as higher bandwidth thresholds (e.g., bandwidth thresholds that are higher than the initial threshold used to determine whether to pre-allocate bandwidth for the network service). Additionally or alternatively, the computing device may compare the current network conditions to the additional parameters at step 452. If the current network conditions also satisfy the specified additional parameters, the method may proceed to step 472 even if a portion of bandwidth has already been reserved for the network service. However, if the current network conditions do not satisfy the additional parameters, but still satisfy the initial specified parameters, the method may proceed to step 474. By determining whether current network conditions warrant the reservation of additional bandwidth for the network service, the computing device may leverage increased availability of resources on the network to apportion said resources for use in implementing/establishing various network services.

Although FIG. 4B depicts method 450 proceeding from step 452 to step 470 if current network conditions satisfy the parameters for pre-allocating bandwidth to implement/establish voice services, the computing device may perform a slightly different method than depicted in FIG. 4B to implement/establish a QoS framework for other network services. For example, if providing network services where on-demand (e.g., per-session) bandwidth requests are preferred as network resources (e.g., bandwidth) become more available, the computing device may implement/establish a QoS framework such that if network conditions do not satisfy specified parameters, bandwidth may be pre-allocated/reserved for the network service session prior to the service being invoked, but if network conditions do satisfy the specified parameters an alternative QoS framework may be applied such that bandwidth may be requested on a per-session basis (e.g., at the time the device may invoke the network service). Thus, in this example of the computing device implementing/establishing a QoS framework for such a service (rather than a voice service), at step 452, if the computing device determines that the current network conditions satisfy the parameters, the method may proceed to step 456, where the computing device may determine whether a session has been requested. If the computing device determines that the current network conditions do not satisfy the parameters, the method may proceed to step 470 where the computing device may determine whether bandwidth has already been allocated for the service. Additionally or alternatively, if the computing device determines that the current network conditions do not satisfy the parameters, the method may proceed to step 472, rather than step 470 where the computing device may transmit a request to pre-allocate bandwidth for implementing/establishing the service.

At step 472, the computing device may request a pre-allocation of bandwidth for implementing/establishing services (e.g., voice services) within the network in advance of the service being invoked/initiated. For example, the computing device may transmit a reservation request to pre-allocate (e.g., reserve) an amount of bandwidth for implementing/establishing one or more voice calls prior to the initiation of a voice service. The computing device may request or pre-allocate any suitable amount of bandwidth for implementing/establishing one or more sessions of a network service (e.g., 100 Kbps, 1 MBps, 1 GBps, etc.). The amount of bandwidth requested by the computing device may vary based on a variety of factors such as the availability of bandwidth within the network, the type of network service for which the bandwidth is being pre-allocated (e.g., reserved), the technology used by computing device (e.g., ISDN, wireless, cable, LAN, etc.), the number of concurrent sessions supported by the network service, and the like. For example, the computing device may access the network data store to determine a per-call bandwidth requirement and an expected number of voice calls that are likely to be invoked within a period of time. In this example, the computing device may determine an amount of bandwidth to request or pre-allocate by multiplying the likely number of calls by the per-call bandwidth requirement. The computing device may transmit a reservation request (and/or some other suitable communication) to an application server that causes the server to make a bandwidth request to a termination system (or other computing device) in the network. The computing device may perform one or more of the operations discussed above with respect to step 440. The computing device may transmit the reservation request to a second computing device that is communicably connected to the computing device. In this example, the computing device may have determined, as discussed above with respect to step 452, that the amount of bandwidth available on the network (and/or the amount of bandwidth between the computing device and the second computing device) satisfies the bandwidth threshold. Additionally or alternatively, the computing device may transmit the reservation request to a third computing device that is communicably connected to the computing device.

At step 474, the computing device may determine whether a particular service has been requested. The computing device (e.g., a voice device) may determine whether it has received a request to initiate a voice service (e.g., a voice call). If the computing device determines that a service has not been requested, the method may return to step 474 and the computing device may continue to monitor whether a session may be requested/invoked. While monitoring for service requests, the computing device may access the network data store to obtain current network information and conditions, and may thus determine whether implementing a different network policy for voice services or other services may be warranted. In the event that a different QoS framework may be warranted, such as if the network conditions no longer satisfy the specified parameters and/or if the parameters have been adjusted, the method may proceed to step 456 (not shown in FIG. 4B). In some examples, the computing device may perform one or more of the operations discussed above with respect to step 446.

At step 474, if the computing device may determine that a service has been requested, the method may proceed to step 476 where the computing device may initiate the service requested at step 474. For example, at step 476, the computing device may initiate a session of the voice service (e.g., a voice call). At step 476, the computing device may perform one or more of the operations discussed above in step 448, such as modifying call setup messages transmitted to the application server.

At step 478, the computing device may determine whether the service initiated at step 476 has ended. For example, the computing device may determine whether a session of the voice service (e.g., the voice call) has ended. If the computing device determines that the service has not ended, the computing device may continue to implement the service initiated at 476 and monitor whether the service is still being used/implemented. At step 478, the computing device may determine whether the network service has ended in a variety of ways, for example, by determining whether a particular voice call has been disconnected/terminated. If the computing device determines that a threshold number of voice calls has been completed, the computing device may determine whether a service has ended. For example, the computing device may determine that the service has ended if a predetermined number of voice calls (e.g., 1 call, 2 calls, 4 calls, 10 calls) have been completed using the current bandwidth reservation (e.g., the bandwidth reserved by the device at step 472).

As yet another example, the computing device may determine that the service has ended if it determines that a threshold amount of time has elapsed since the computing device reserved the bandwidth for implementing the service. The computing device may consider a voice service to have ended if it determines that a threshold amount of time has elapsed since the voice service was invoked by the computing device. As still another example, the computing may consider a video service to have ended if it determines that a content item (e.g., a television program, VOD item) implemented/played by the video service has ended. As another example, the computing may consider a video service to have ended if it determines that a predetermined amount of time (e.g., a day, a week, a month) for providing the video service to the user has ended. In this example, a network administrator may adjust the predetermined amount of time (e.g., promotional time period) that the video service may be made available to the user.

At step 478, the computing device may monitor whether network conditions have changed, thus warranting the computing device to implement/establish a different framework, such as a framework that causes the computing device to request bandwidth for voice services on a per-session basis. For example, the computing device may access a network data store to obtain information indicating an amount of bandwidth on a particular communication link in the network (e.g., the link between the computing device and the termination system) as well as information indicating parameters for implementing/establishing the QoS framework, such as a bandwidth threshold. In such case, if the available bandwidth on the communication link fails to satisfy the bandwidth threshold, the computing device may begin implementing/establishing an alternative QoS framework, for example, wherein the computing device may request bandwidth at the time the service may be invoked/initiated, rather than pre-allocating/reserving bandwidth in advance of the service being invoked/initiated. The computing device may release the bandwidth previously reserved at step 472, and the method may proceed to step 456, where the computing device may monitor for service requests.

If the computing device determines that the network service has ended, at step 478, the method may proceed back to step 451, where the computing device may determine the current QoS framework for implementing/establishing network services on the network. Although not shown in FIG. 4B, if the computing device determines that the service has ended, at step 478, the method may return to step 452 where the computing device may determine whether network conditions satisfy the specified parameters for pre-allocating bandwidth to be used for implementing/establishing voice services. If the computing device determines that the parameters are still satisfied, the computing device may continue to use the pre-allocated bandwidth to implement/establish voice services. At step 478, if the computing device determines that the service has ended, the method may return to step 474, where the computing device may monitor incoming service requests. The computing device may not immediately determine whether current network conditions satisfy the specified parameters, but instead may assume that the current network conditions do satisfy the parameters.

Referring back to step 452 in FIG. 4B, if the computing device determines that the current network conditions do not satisfy the parameters, the method may proceed to step 456 where the computing device may determine whether a particular session (e.g., voice call) has been requested. For example, the computing may determine whether it has received a request to initiate a voice service (e.g., a voice call). If the computing device determines that a service has not been requested, the method may return to step 451. Although not shown in FIG. 4B, if the computing device determines that a service has not been requested, the method may return to step 456 and the computing device may continue to monitor whether a session of the network service may be requested/invoked. While monitoring for service requests, the computing device may access the network data store to obtain current network information and conditions, and may thus determine whether implementing/establishing a different network policy for voice services or other services may be warranted. At step 456, if the computing device determines that a service has been requested, the method may proceed to step 458.

At step 458, the computing device may initiate a service, such as the service requested at step 456. For example, a service application (either integral to or remotely located from the computing device) may respond to the service request received at step 420 initiating a session of the voice service (e.g., a voice call). The service application may determine the appropriate QoS framework for implementing/establishing the voice call and whether any bandwidth has been allocated to perform the requested voice service. At step 456, the computing device may perform one or more of the operations discussed above in step 422.

At step 460, the computing device may request bandwidth for the service. For example, the computing device may transmit a data transfer message to an application server to request bandwidth for the voice service (e.g., voice call). If the application server receives the message, the application server may make/transmit the bandwidth request through to a termination system in the network. Additionally or alternatively, at step 460, the computing device may perform one or more of the operations discussed above with respect to step 424. If the bandwidth request has been granted, the computing device may use the granted bandwidth to implement/establish the session initiated at step 458.

At step 462, the computing device may determine whether the service has ended. For example, the computing device may determine that a session of the voice service (e.g., the voice call) has ended. If the service has not ended, the method may return to step 462 where the computing device may continue to monitor whether the service is still being used/implemented. At step 462, the computing device may determine whether network conditions have changed, thus warranting the computing device to implement/establish a different QoS framework. If the computing device determines that network condition parameters have been satisfied, and the current session of the network service has ended, the method may proceed to step 472 (not shown in FIG. 4B), where the computing device may pre-allocate (e.g., reserve) bandwidth for implementing/establishing network services.

At step 462, if the computing device determines that the network service (e.g., voice call) has ended, the method may proceed back to step 451, where the computing device may determine the current QoS framework for implementing/establishing services on the network. If the computing device determines that the service has ended, the method may return to step 452, where the computing device may determine whether network conditions satisfy the specified parameters for pre-allocating bandwidth for implementing/establishing voice services. If the computing device determines that the parameters are still not satisfied, the computing device may continue to request bandwidth on a per-session basis (e.g., at the time of call setup) to implement/establish voice services. At step 462, if the computing device determines that the service has ended, the method may return to step 456, where the computing device may monitor incoming service requests. The computing device may not immediately determine whether current network conditions satisfy the specified parameters, but instead may assume that the current network conditions still do not satisfy the parameters and may continue to make on-demand bandwidth requests in response to a subsequent voice service request.

Figure 5A:
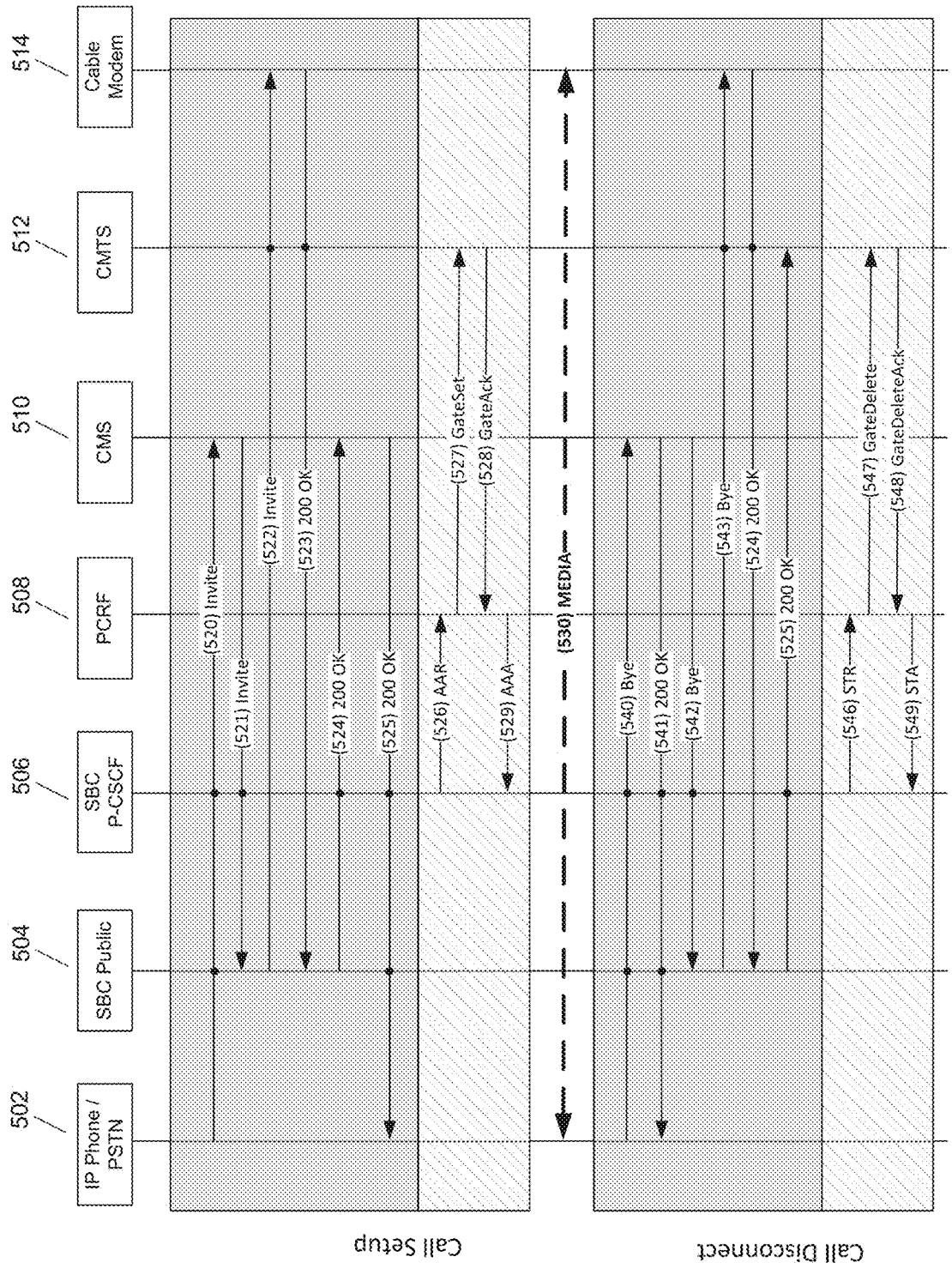
FIGS. 5A and 5B are call-flow diagrams of an example method for variably applying a quality of service framework within a network.
Figure 5B:
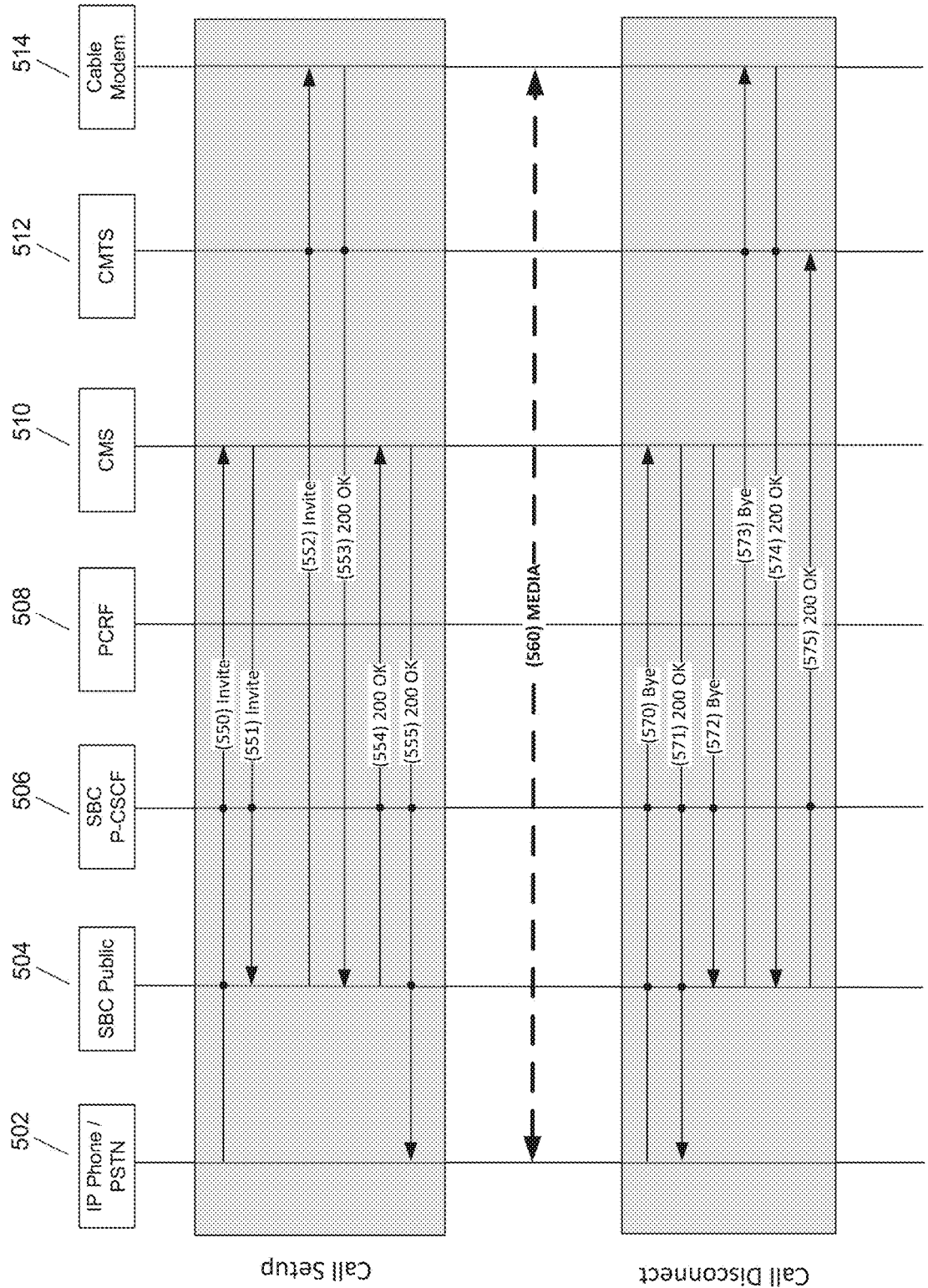

FIGS. 5A-5B, are call-flow diagrams showing example sequences of communication between components to reserve/allocate bandwidth for a voice call. Examples of devices that may perform the steps are shown in FIGS. 5A and 5B. The devices may also be, for example, devices described above with respect to FIGS. 3 and 4A-B. The call-flow diagram in FIG. 5A demonstrates a sequence, as described above with respect to FIGS. 4A and 4B, where the computing device (e.g., a voice device) does not invoke a (QoS) framework for pre-allocating bandwidth based on current network conditions, and instead may request bandwidth for a voice call on a per-session basis (e.g., requesting bandwidth at the time of call setup). As shown in FIG. 5A, a series of invites and acceptances may be transmitted across the network to establish a communication session between a caller and a callee. In particular, a voice device (e.g., the IP phone 502) may transmit an invite (e.g., the invite 520) to a call management service (e.g., CMS 510) to establish a communication session with a landline phone (e.g., the phone 117) associated with the callee. The landline phone may be communicably connected (and/or integral) to the cable modem 514. The IP phone 502 may use voice-over-IP technologies for placing and transmitting voice calls over an IP network. In this example, if the caller attempts to establish a voice call with the callee, the QoS framework implemented/established within the network may be established for the benefit of and use by the landline phone. Similarly, for an outgoing call from the landline phone to the IP Phone 502, the QoS framework may be established to benefit the implementation of service over the network via the landline phone.

In FIG. 5A, the IP phone 502 may be associated with the caller who is attempting to initiate a voice call with the callee. The device 502 may comprise a device capable of operating and setting up voice calls via a public switch telephone network (PSTN). The invite 520 may be routed through a public session border controller (e.g., the SBC 504) and/or through an SBC proxy for call session control (e.g., the P-CSCF 506). If the CMS 510 receives the invite 520, the CMS 510 may transmit an invite (e.g., the invite 521) to the SBC 504. The SBC 504 may transmit an invite (e.g., the invite 522) to a cable modem (e.g., the modem 514). In the sequence shown in FIG. 5A, the modem 514 may be associated with the caller who is attempting to contact the callee. Invite 522 may be routed through a termination system (e.g., the CMTS 512) prior to arriving at the modem 514. If the modem 514 receives the invite 522, the modem 514 may transmit a message (e.g., the OK message 523) to the SBC 504 indicating whether the request (i.e., the invite 522) has succeeded. The message 523 may be routed through the CMTS 512 before arriving at the SBC 504. If the SBC 504 receives the message 523, the SBC 504 may transmit a message (e.g., the OK message 524) to the CMS 510 indicating whether the request (i.e., the invite 521) has succeeded. The message 524 may be routed through the P-CSCF 506 before arriving at the CMS 510. If the CMS 510 receives the message 524, the CMS 510 may transmit a message (e.g., the OK message 525) to the IP phone 502 indicating whether the request (i.e., the invite 520) has succeeded.

During the call setup, to secure bandwidth for the incoming voice call, the P-CSCF 506 (or another call agent) may transmit an "Authenticate and Authorize Request" (AAR) message (e.g., the AAR 526) to the PCRF 508 to establish a secure connection and to request quality of service reservation of local resources (e.g., bandwidth) for the voice call. The AAR message 526 may also define the bandwidth characteristics of the media stream being requested, thus allowing a bandwidth manager (e.g., the termination system) to determine how much resource and between which network, ingress, and egress points are being requested. As shown in FIG. 5A, a GateSET command (e.g., the GateSet 527) may be transmitted from the PCRF 508 to the CMTS 512. The GateSET command may notify the CMTS 512 that the device making the call request may be authorized for the required network resources (e.g., bandwidth), and further may provide the bandwidth characteristics transmitted in the AAR 526.

During call setup, the CMTS 512 may reserve the local resources for the incoming voice call. The CMTS 512 may transmit a GateACK message (e.g., the GateAck 528) to the PCRF 508, which may send an "Authenticate and Authorize Accept" (AAA) message (e.g., the AAA 529) notifying the P-CSCF 506 of the result of the AAR 526. If the IP phone 502 and the cable modem 514 have reserved the required resources for the voice call, the reserved bandwidth may be used to allow the flow of voice data (e.g., the Media 530) between the two network components. As also shown in FIG. 5A, a similar process as described above with respect to requesting bandwidth during call setup may occur if a call is disconnected/ended and the bandwidth previously reserved for the voice call may be released.

As shown in FIG. 5A, a series of invites and acceptances may be transmitted across the network to disconnect/terminate a communication session established between the caller and the callee. As further shown in FIG. 5A, during the termination of the communication session, a series of communications may be sent to release bandwidth that was reserved during the time of call setup. For example, to release the bandwidth for the voice call, the P-CSCF 506 (or another call agent) may transmit an "Session Termination Request" (STR) message (e.g., the STR 546) to the PCRF 508 to release quality of service reservation of local resources (e.g., bandwidth) for the voice call. A GateDelete command (e.g., the GateDelete 547) may be transmitted from PCRF 508 to the CMTS 512. The GateSET command may notify the CMTS 512 that the device making the call request may be authorized to release the required network resources (e.g., bandwidth). The CMTS 512 may release the local resources for the voice call such that other devices may use the now available bandwidth. The CMTS 512 may transmit a GateDeleteACK message (e.g., the GateDeleteAck548) to the PCRF 508, which may send an "Session Termination Accept" (STA) message (e.g., the STA 549) notifying the P-CSCF 506 of the result of the AAR 526.

Referring now to FIG. 5B, this example call-flow diagram depicts the system of FIG. 5A after network conditions may have improved and additional bandwidth may be available on the network. In particular, FIG. 5B depicts a sequence of communications for implementing/establishing a voice call if the system may have already determined that specified parameters were met by current network conditions (e.g., a bandwidth threshold has been satisfied), and bandwidth may have already been pre-allocated for implementing/establishing network services (e.g., voice calls), as discussed above with respect to steps 472-476. Like FIG. 5A, FIG. 5B depicts a series of invites and acceptances that may be transmitted across the network, during the call setup, to establish a communication session between a caller and a callee. As discussed above, with respect to steps 440-448 of FIG. 4A, a computing device may request bandwidth prior to the time of call setup. Additionally or alternatively, the computing device may request bandwidth during a device configuration process.

As shown in FIG. 5B, the IP phone 502 may transmit an invite (e.g., the invite 550) to the CMS 510 to establish a communication session. The Invite 550 may be routed through the SBC 504 and/or through the P-CSCF 506. If the CMS 510 receives the invite 550, the CMS 510 may transmit an invite (e.g., the invite 551) to the SBC 504. The SBC 504 may transmit an invite (e.g., the invite 552) to the modem 514. The Invite 552 may be routed through the CMTS 512 prior to arriving at the modem 514. A series of OK message may be transmitted between the devices to indicate whether the invite(s) has succeeded. For example, the OK message 553 may be routed through the CMTS 512 before arriving at the SBC 504 to indicate whether the invite 552 has succeeded. Because bandwidth and/or other network resources may have already been reserved/pre-allocated for the voice call, as shown in FIG. 5B, during the call-setup, a bandwidth request for the voice call may not be communicated to the CMTS 512 or the other devices, as was described above with respect to the AAR 526, the GateSet 527, the GateAck 528, and the AAA 529 in FIG. 5A. By pre-allocating bandwidth for voice applications (and/or other applications/services) prior to the time of call-setup, the amount of time and resources used during the call setup may effectively be reduced, thus allowing the system to perform more quickly/efficiently and to provide the user with improved quality of service.

Although examples are described above, the various elements, examples, and/or steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
  based on having an insufficient amount of resources for a service, configuring, by a computing device, the service and waiting for a request associated with the service;
  after receiving the request associated with the service, sending a request for an amount of resources sufficient for the service; and
  based on an indication of an amount of allocated resources sufficient for the service, using the allocated resources for the service.

2. The method of claim 1, wherein the service is associated with a plurality of service applications, the method further comprising:
  determining, based on one or more parameters associated with a computing device, a service application of the plurality of service applications for implementing the service.

3. The method of claim 2, wherein the one or more parameters associated with the computing device indicate current network conditions.

4. The method of claim 1, wherein the amount of resources is a portion of a total amount of resources associated with a network.

5. The method of claim 1, wherein the service is one of a plurality of services, and wherein the plurality of services comprise at least one of: real-time voice calls, online gaming, media streaming, video-conferencing, or video-on-demand.

6. The method of claim 1, further comprising:
  after a session of the service has been terminated, sending a communication indicating a release of the allocated resources.

7. The method of claim 1, further comprising:
  based on the having another insufficient amount of resources for the service and after receiving a second request associated with the service, sending a request for a second amount of resources sufficient for the service.

8. The method of claim 1 further comprising:
  based on the having another insufficient amount of resources for the service, sending, on a per-session basis, a request for a second amount of resources sufficient for one or more sessions of the service.

9. The method of claim 8, further comprising:
receiving, after sending the request for the second amount of resources, information indicating a second amount of allocated resources sufficient for the one or more sessions of the service; and
using the second amount of allocated resources to send data associated with a session, of the one or more sessions, of the service.

10. The method of claim 1, wherein the configuring the service comprises configuring at least one of the computing device or a network device.

11. An apparatus comprising:
one or more processors; and
memory storing computer executable instructions that, when executed by the one or more processors, cause the apparatus to:
based on having an insufficient amount of resources for a service, configure the service and wait for a request associated with the service;
after receiving the request associated with the service, send a request for an amount of resources sufficient for the service; and
based on an indication of an amount of allocated resources sufficient for the service, use the allocated resources for the service.

12. The apparatus of claim 11, wherein the service is associated with a plurality of service applications, and wherein the instructions, when executed by the one or more processors, further cause the apparatus to:
determine, based on one or more parameters associated with a computing device, a service application of the plurality of service applications for implementing the service.

13. The apparatus of claim 12, wherein the one or more parameters associated with the computing device indicate current network conditions.

14. The apparatus of claim 11, wherein the amount of resources is a portion of a total amount of resources associated with a network.

15. The apparatus of claim 11, wherein the service is one of a plurality of services, and wherein the plurality of services comprise at least one of: real-time voice calls, online gaming, media streaming, video-conferencing, or video-on-demand.

16. The apparatus of claim 11, wherein the instructions, when executed by the one or more processors, further cause the apparatus to:
send, after a session of the service has been terminated, a communication indicating a release of the allocated resources.

17. The apparatus of claim 11, wherein the instructions, when executed by the one or more processors, further cause the apparatus to:
based on the having another insufficient amount of resources for the service and after receiving a second request associated with the service, send a request for a second amount of resources sufficient for the service.

18. The apparatus of claim 11, wherein the instructions, when executed by the one or more processors, further cause the apparatus to:
based on the having another insufficient amount of resources for the service, send, on a per-session basis, a request for a second amount of resources sufficient for one or more sessions of the service.

19. The apparatus of claim 18, wherein the instructions, when executed by the one or more processors, further cause the apparatus to:
receive, after sending the request for the second amount of resources, information indicating a second allocated resources sufficient for the one or more sessions of the service; and
use the second amount of allocated resources to send data associated with a session, of the one or more sessions, of the service.

20. One or more non-transitory computer readable media storing instructions that, when executed cause:
based on having an insufficient amount of resources for a service, configuring the service and waiting for a request associated with the serviced;
after receiving the request associated with the service, sending a request for an amount of resources sufficient for the service; and
based on an indication of an amount of allocated resources sufficient for the service, using the allocated resources for the service.

21. The one or more non-transitory computer readable media of claim 20, wherein the service is associated with a plurality of service applications, and wherein the instructions, when executed, further cause determining, based on one or more parameters associated with a computing device, a service application of the plurality of service applications for implementing the service.

22. The one or more non-transitory computer readable media of claim 20, wherein the one or more parameters associated with the computing device indicate current network conditions.

23. The one or more non-transitory computer readable media of claim 20, wherein the amount of resources is a portion of a total amount of resources associated with a network.

24. The one or more non-transitory computer readable media of claim 20, wherein the service is one of a plurality of services, and wherein the plurality of services comprise at least one of: real-time voice calls, online gaming, media streaming, video-conferencing, or video-on-demand.

25. The one or more non-transitory computer readable media of claim 20, wherein the instructions, when executed, further cause:
sending, after a session of the service has been terminated, a communication indicating a release of the allocated resources.

26. The one or more non-transitory computer readable media of claim 20, wherein the instructions, when executed, further cause:
based on the having another insufficient amount of resources for the service and after receiving a second request associated with the service, sending a request for a second amount of resources sufficient for the service.

27. The one or more non-transitory computer readable media of claim 20, wherein the instructions, when executed, further cause:
based on the having another insufficient amount of resources for the service, sending, on a per-session basis, a request for a second amount of resources sufficient for one or more sessions of the service.

28. The one or more non-transitory computer readable media of claim 27, wherein the instructions, when executed, further cause:
receiving, after sending the request for the second amount of resources, information indicating a second amount of allocated resources sufficient for the one or more sessions of the service; and using the second amount of allocated resources to send data associated with a session, of the one or more sessions, of the service.

\* \* \* \* \*

UNITED STATES PATENT AND TRADEMARK OFFICE
CERTIFICATE OF CORRECTION

| | | |
|---|---|---|
| PATENT NO. | : 11,751,103 B2 | Page 1 of 1 |
| APPLICATION NO. | : 17/484742 | |
| DATED | : September 5, 2023 | |
| INVENTOR(S) | : Klatsky et al. | |

It is certified that error appears in the above-identified patent and that said Letters Patent is hereby corrected as shown below:

In the Claims

Column 34, Claim 19, Line 5:
After "second", insert --amount of--

Column 34, Claim 20, Line 15:
Delete "serviced;" and insert --service;--

Signed and Sealed this
Fifteenth Day of October, 2024

Katherine Kelly Vidal
*Director of the United States Patent and Trademark Office*